United States Patent
Zhong et al.

(10) Patent No.: US 8,331,323 B2
(45) Date of Patent: Dec. 11, 2012

(54) INTER-NETWORK TUNNEL SWITCHING METHOD AND INTER-NETWORK INTERCONNECTION DEVICE

(75) Inventors: Xin Zhong, Shenzhen (CN); Jixing Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 12/891,464

(22) Filed: Sep. 27, 2010

(65) Prior Publication Data

US 2011/0019609 A1 Jan. 27, 2011

Related U.S. Application Data

(63) Continuation of application No. PCT/CN2009/071000, filed on Mar. 25, 2009.

(30) Foreign Application Priority Data

Mar. 28, 2008 (CN) .......................... 2008 1 0027079

(51) Int. Cl.
*H04B 7/14* (2006.01)
*H04J 1/00* (2006.01)
*H04W 4/00* (2009.01)

(52) U.S. Cl. ...................................... 370/331; 370/315
(58) Field of Classification Search .................. 370/315, 370/331
See application file for complete search history.

(56) References Cited

U.S. PATENT DOCUMENTS

| 6,611,547 | B1 | 8/2003 | Rauhala | |
| 8,027,309 | B2 * | 9/2011 | Kotecha et al. | 370/331 |
| 8,107,433 | B2 * | 1/2012 | Jokinen | 370/331 |
| 2005/0163079 | A1 | 7/2005 | Taniuchi et al. | |
| 2006/0104262 | A1 * | 5/2006 | Kant et al. | 370/352 |
| 2007/0213060 | A1 | 9/2007 | Shaheen | |
| 2007/0287417 | A1 | 12/2007 | Abramovich | |
| 2009/0016300 | A1 * | 1/2009 | Ahmavaara et al. | 370/331 |
| 2009/0022100 | A1 * | 1/2009 | Fiat | 370/329 |
| 2009/0238159 | A1 * | 9/2009 | Takano et al. | 370/338 |
| 2009/0296655 | A1 * | 12/2009 | Tamura | 370/331 |
| 2009/0303966 | A1 * | 12/2009 | Cherian et al. | 370/331 |

FOREIGN PATENT DOCUMENTS

| CN | 1252918 A | 5/2000 |
| CN | 1926822 A | 3/2007 |
| CN | 101039507 A | 9/2007 |

(Continued)

OTHER PUBLICATIONS

Office Action issued in corresponding Chinese Patent Application No. 200810027079.1, mailed Aug. 9, 2010.

(Continued)

*Primary Examiner* — Kenny Lin

(74) *Attorney, Agent, or Firm* — Brinks Hofer Gilson & Lione

(57) ABSTRACT

An inter-network tunnel switching method includes the following steps: a first inter-network interconnection device on a first network sets up a second tunnel between the first inter-network interconnection device and a second inter-network interconnection device on a second network and triggers the switching from a first tunnel to the second tunnel. The first and second tunnels are configured to forward signaling between a mobile station (MS) on the first network and the second network or between an MS on the second network and the first network. A first inter-network interconnection device is also provided.

21 Claims, 14 Drawing Sheets

FOREIGN PATENT DOCUMENTS

| | | | |
|---|---|---|---|
| CN | 101072425 A | 11/2007 | |
| CN | 101547483 B | 4/2011 | |
| EP | 1950992 A1 | * | 7/2008 |
| WO | WO 2005/018165 A2 | 2/2005 | |
| WO | WO 2005/096556 A1 | 10/2005 | |
| WO | WO 2007/082132 A2 | 7/2007 | |
| WO | WO 2009/117956 A1 | 10/2009 | |

OTHER PUBLICATIONS $3^{rd}$ Generation Partnership Project: Technical Specification Group Services and System Aspects; Architecture Enhancements for non-3GPP Accesses (Release 8). Technical Specification 3GPP TS 23.402, v8.0.0, Dec. 2007.

$3^{rd}$ Generation Partnership Project 2 "3GPP2", "A.S0022-0—Section 3.15.2.1", Hollywood, California, Jan. 14-18, 2008.

$3^{rd}$ Generation Partnership Project 2 "3GPP2", "A.S0022-0—Section 3.15.2.2", Hollywood, California, Jan. 14-18, 2008.

$3^{rd}$ Generation Partnership Project 2 "3GPP2", Interoperability Specification (IOS) for High Rate Packet Data (HRPD) Radio Access Network Interfaces with Session Control in the Access Network. 3GPP2 A.S0008-C V. 2.0, Jan. 2009.

Written Opinion of the International Searching Authority issued in corresponding PCT Patent Application No. PCT/CN2009/071000, mailed Jun. 25, 2009.

* cited by examiner

INTER-NETWORK TUNNEL SWITCHING METHOD AND INTER-NETWORK INTERCONNECTION DEVICE

CROSS-REFERENCE TO RELATED APPLICATIONS

This application is a continuation of International Application No. PCT/CN2009/071000, filed on Mar. 25, 2009, which claims priority to Chinese Patent Application No. 200810027079.1, filed on Mar. 28, 2008, both of which are hereby incorporated by reference in their entireties.

FIELD OF THE DISCLOSURE

The present disclosure relates to the communications field, and in particular, to an inter-network tunnel switching method and an inter-network connection device.

BACKGROUND

At present, a hot topic that the organizations for standardization discuss is the interworking between an evolved Third Generation Partnership Project (3GPP) network and a non-3GPP network. The evolved 3GPP network includes two projects: long term evolution (LTE) and system architecture evolution (SAE). The LTE focuses on improving air interfaces, and the SAE focuses on improving the core network. For example, two interfaces (S101 and Sx-U) are added between a 3GPP network and a high rate packet data (HRPD) network for interconnecting the two networks. The S101 interface connects a mobility management entity (MME) and an enhanced access network (eAN). Essentially, the S101 interface is a tunnel and is used to forward signaling messages between a mobile station (MS) and a target network so as to assist the MS in pre-registration on the target network or handover from the source network to the target network. The Sx-U interface connects a serving gateway and an HRPD serving gateway (HSGW), and is used to forward the remaining user data in the evolved 3GPP network to the HRPD network. Then the HRPD network sends the data to the MS.

Assume that a dual-mode MS has only one transmitter, that is, the MS can send data on only one type of networks. In this case, when sending and receiving data on a network, the MS cannot perform registration, authentication, or session negotiation on another network. As a result, before performing handover between different access technologies, the MS must spend one to two seconds on registration, authentication, or session negotiation. This interrupts data transmission, thus greatly affecting the quality of real-time services during handover. To reduce the interruption time of real-time services during handover, the pre-registration is put forward. That is, an MS performs registration, authentication, or session negotiation on the target network through the tunnel from the source network to the target network while sending and receiving data on the source network. When performing inter-network handover, the MS can send and receive data on the target network immediately. This greatly reduces the service interruption time during inter-network handover.

After the MS performs pre-registration and before the MS is handed over to the target network, the MS can perform signaling interaction with the target network through the source network and the tunnel between the source network and the target network (for example, the S101 interface between the 3GPP network and the HRPD network) at any time, if required. For example, when the configuration information of the quality of service (QoS) changes, the MS re-negotiates session information with the target network.

To ensure that the MS can perform signaling interaction with the target network through the tunnel between the source network and the target network after the MS performs pre-registration and before the MS is handed over to the target network, the interconnected network needs to support the tunnel switching between the source network and the target network.

For example, after the MS performs re-registration and before the MS is handed over to the target network, the MME or the AN may be changed due to mobility management. The following takes the interconnection between an evolved 3GPP network and an HRPD network as an example. Specifically, four scenarios are provided, as shown in Table 1.

TABLE 1

|  | Context transfer of the MS [from the source MME to the target MME] | Session information transfer of the MS [from the source AN to the target AN] |
| --- | --- | --- |
| The MS is currently served by the evolved 3GPP network. | The MS moves to the target MME from the current MME. The MS, however, does not leave the management scope of the AN associated with the source MME. The source MME enables MME relocation to transfer the contexts of the MS to the target MME. (scenario 1) | The MS moves within the management scope of the current MME. The MS, however, leaves the management scope of the AN associated with the source MME and enters the management scope of the target AN. The MS registers with the target AN through the new S101 interface to transfer the session information of the MS to the target AN from the source AN. (scenario 2) |
| The MS is currently served by the HRPD network. | The MS moves within the management scope of the current AN. The MS, however, leaves the management scope of the MME associated with the current AN and enters the management scope of the target MME. The MS registers with the target MME through the new S101 interface to transfer the contexts of the MS to the target MME from the source MME.(scenario 4) | The MS leaves the management scope of the current AN and enters the management scope of the target AN. The MS, however, does not leave the management scope of the MME associated with the source AN. The source AN enables AN session transfer to transfer the sessions of the MS to the target AN. (scenario 3) |

In scenario 1, the source MME enables MME relocation to transfer the contexts of the MS to the target MME. The target MME sets up a new S101 tunnel for the MS, but the AN does not know whether the new S101 tunnel is set up for an MS without session information or is used to replace a current existing S101 tunnel. When the AN needs to send a signaling message to the MS, the AN still sends the signaling message to the source MME through the original S101 tunnel for forwarding. Therefore, the MS is disconnected from the source MME and thus the signaling message from the AN cannot be sent to the MS.

In scenario 3, the source AN enables an AN session transfer to transfer the sessions of the MS to the target AN. The target AN sets up a new S101 tunnel for the MS, but the MME does not know whether the new S101 tunnel is set up for an MS without session information or is used to replace a current existed S101 tunnel. When the MME needs to send a signaling message to the MS, the MME still sends the signaling message to the source AN through the original S101 tunnel for forwarding. Obviously, the MS is disconnected from the source AN and thus the signaling message from the MME cannot be sent to the MS.

Thus, in the implementation of the prior art, the S101 tunnel cannot be switched in scenarios 1 and 3, which may make messages lost.

SUMMARY

An embodiment of the present disclosure provides an inter-network tunnel switching method. The method includes:

by an inter-network interconnection device on a first network, setting up a second tunnel between the inter-network interconnection device on the first network and a second inter-network interconnection device on a second network; and triggering the switching from a first tunnel to the second tunnel, where the first and second tunnels are configured to forward the signaling between the MS on the first network and the second network or between the MS on the second network and the first network.

An embodiment of the present disclosure provides an inter-network interconnection device. The inter-network interconnection device is located on a first network and includes:

a setup triggering unit, configured to set up a second tunnel between the inter-network interconnection device on the first network and a second inter-network interconnection device on a second network and trigger the switching from a first tunnel to the second tunnel, where the first and second tunnels are configured to forward the signaling between the MS on the first network and the second network or between the MS on the second network and the first network.

In embodiments of the present disclosure, the inter-network interconnection device on the first network sets up a second tunnel to the second inter-network interconnection device on the second network and triggers the switching from the first tunnel to the second tunnel. The first and second tunnels are configured to forward the signaling between the MS on the first network and the second network or between the MS on the second network and the first network. When the second tunnel is set up, the switching from the first tunnel to the second tunnel is triggered.

DETAILED DESCRIPTION OF THE EMBODIMENTS

The following describes the embodiments of the present disclosure in more detail with reference to the accompanying drawings.

Figure 1:
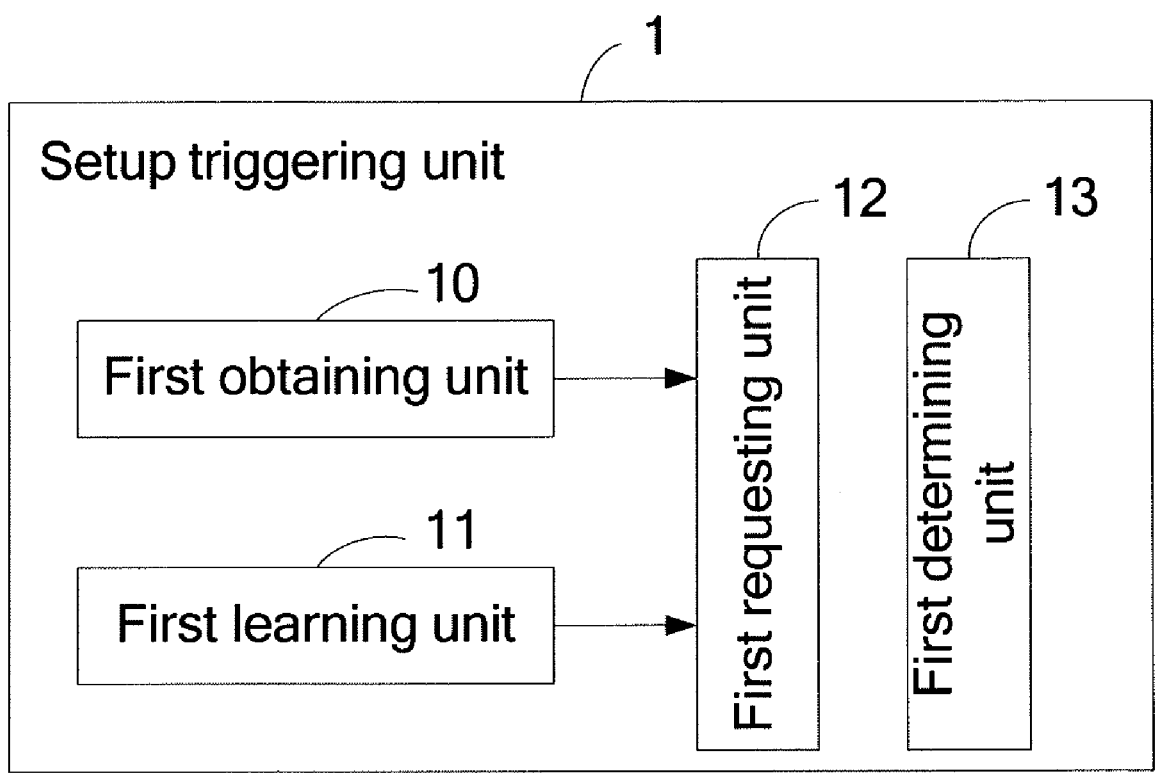
FIG. 1 shows a structure of an inter-network interconnection device in an embodiment of the present disclosure.

An embodiment of the present disclosure provides an inter-network interconnection device. As shown in FIG. 1, the inter-network interconnection device is located on the first network and includes a setup triggering unit 1. The setup triggering unit 1 is configured to set up a second tunnel to the second inter-network interconnection device on the second network and trigger the switching from the first tunnel to the second tunnel. The first and second tunnels are configured to forward the signaling between the MS on the first network and the second network. Further, the setup triggering unit 1 includes a first obtaining unit 10, a first learning unit 11, a first requesting unit 12, and a first determining unit 13.

The first obtaining unit 10 is configured to obtain the ID of the first tunnel from the third inter-network interconnection device on the first network.

The first learning unit 11 is configured to learn that the MS associated with the first tunnel has been handed over to the base station (BS) managed by the inter-network interconnection device from the BS managed by the third inter-network interconnection device.

The first requesting unit 12 is connected to the first obtaining unit 10 and the first learning unit 11, and is configured to send a tunnel switch request to the second inter-network interconnection device on the second network. The tunnel switch request carries the ID of the second tunnel that the inter-network interconnection device allocates to the MS, the ID of the first tunnel, and the ID of the third inter-network interconnection device to instruct the second inter-network interconnection device to set up the second tunnel with the inter-network interconnection device and switch the first tunnel between the second inter-network interconnection device and the third inter-network interconnection device to the second tunnel.

The first determining unit 13 is configured to determine that the second tunnel to the second inter-network interconnection device is set up and that the first tunnel is switched to the second tunnel after receiving a tunnel switch Ack sent from the second inter-network interconnection device.

In specific implementation, the first or second network may be an evolved 3GPP network (SAE/LTE network), an HRPD network, a wireless local access network (WLAN), or a worldwide interoperability for microwave access (WiMAX) network. The inter-network interconnection device may be an access service network (ASN) when the first or second network is a WiMAX network, an access point (AP) when the first or second network is a WLAN, an MME when the first or second network is an evolved 3GPP network, or an AN when the first or second network is an HRPD network. In the same Interconnection network architecture, the second network is different from the first network. For example, when the first network is an evolved 3GPP network and the second network is an HRPD network, the inter-network interconnection device and the third inter-network interconnection device are MMEs, and the second inter-network interconnection device is an AN. When the first network is an HRPD network and the second network is an evolved 3GPP network, the inter-network interconnection device and the third inter-network interconnection device are ANs, and the second inter-network interconnection device is an MME. The following provides examples to describe the implementation.

EXAMPLE 1

When the first network is an evolved 3GPP network, the second network is an HRPD network, the inter-network interconnection device and the third inter-network interconnection device are MMEs, and the second inter-network interconnection device is an AN, the first and second tunnels may be S101 tunnels (or other tunnels when the networks other than the evolved 3GPP network and HRPD network are used). In this case, an MS is located on the evolved 3GPP network and moves to the inter-network interconnection device (hereinafter referred to as the target MME in this example) from the third inter-network interconnection device (hereinafter referred to as the source MME in this example). The MS, however, does not leave the management scope of the second inter-network interconnection device (hereinafter referred to as the inter-network AN in this example) associated with the source MME. The source MME enables MME relocation to transfer the contexts of the MS to the target MME, which involves S101 tunnel switching. In this example, the first tunnel may be called a source S101 tunnel and the second tunnel may be called a new S101 tunnel. In this case, the first obtaining unit 10 of the inter-network interconnection device (target MME) may obtain the ID of the source S101 tunnel according to the MME Relocation Request message sent from the source MME. In actual applications, other messages such as an independent message may be used to carry the ID of the source S101 tunnel. After receiving the Handover Notify message that the BS managed by the target MME sends to the target MME, the first learning unit 11 can learn that the MS associated with the source S101 tunnel has been handed over to the BS managed by the target MME from the BS managed by the source MME. The first requesting unit 12 is connected to the first obtaining unit 10 and the first learning unit 11. Thus, the first requesting unit 12 can send an S101 Switch Command message to the AN to instruct the AN to set up a new S101 tunnel with the target MME and switch the source S101 tunnel between the AN and the source MME to the new S101 tunnel. The S101 Switch Command message carries the ID of the new S101 tunnel that the target MME allocates to the MS, the ID of the source S101 tunnel, and the ID of the source MME.

Any S101 tunnel is uniquely identified by an S101 session ID. The S101 tunnel and S101 session ID need to comply with the following rules:

Each S101 message includes an S101 session ID for differentiating the MS contexts on the MME and HRPD-AN.

The S101 session ID uniquely identifies an S101 interface between the HRPD-AN and the MME.

The S101 session ID is created by the node (MME or HRPD-AN) that sends the first S101 message on the S101 interface.

The S101 session ID is valid for the interface between the HRPD-AN and the MME as long as the HRPD-AN and MME have the contexts/sessions of the MS. When any party changes, for example, in the case of MME relocation or HRPD dormant session handoff, the unique S101 session ID of the interface between a new pair of nodes is selected.

The S101 session ID is unique for the S101 interface and can be used to differentiate the contexts of MSs. Once a node (MME or HRPD-AN) creates an S101 session ID, both nodes should add the S101 session ID to each S101 signaling message and should not change the S101 session ID as long as they have the contexts of the MS.

After receiving the S101 Switch Ack message from the AN, the first determining unit 13 can determine that the new S101 tunnel to the AN is set up and that the source S101 tunnel is switched to the new S101 tunnel.

EXAMPLE 2

When the first network is an HRPD network, the second network is an evolved 3GPP network, the inter-network interconnection device and the third inter-network interconnection device are ANs, and the second inter-network interconnection device is an MME, the first and second tunnels are still S101 tunnels. In this case, the MS is located on the HRPD network and moves to the inter-network interconnection device (hereinafter referred to as the target AN in this example) from the third inter-network interconnection device (hereinafter referred to as the source AN in this example). The MS, however, does not leave the management scope of the second inter-network interconnection device (hereinafter referred to as the MME in this example) associated with the source AN. The source AN enables an AN session transfer to transfer the sessions of the MS to the target AN, which involves S101 tunnel switching. In this example, the first tunnel may be called a source S101 tunnel and the second tunnel may be called a new S101 tunnel. In this case, the first obtaining unit 10 of the inter-network interconnection device (target AN) may obtain the ID of the source S101 tunnel according to the A16 Session Transfer Request message sent from the source AN. In actual applications, other messages such as an independent message may be used to carry the ID of the source S101 tunnel. After capturing the MS on the target AN and completing route resetting of the application protocol layer, the first learning unit 11 can learn that the MS associated with the source S101 tunnel is handed over to the BS managed by the target AN from the BS managed by the source AN. The first requesting unit 12 is connected to the first obtaining unit 10 and the first learning unit 11. Thus, the first requesting unit 12 can send an S101 Switch Command message to the MME to instruct the MME to set up a new S101 tunnel with the target AN and switch the source S101 tunnel between the MME and the source AN to the new S101 tunnel. The S101 Switch Command message carries the ID of the new S101 tunnel that the target AN allocates to the MS, the ID of the source S101 tunnel, and the ID of the source AN. After receiving the S101 Switch Ack message sent from the MME, the first determining unit 13 can determine that the new S101 tunnel to the MME is set up and that the source S101 tunnel is switched to the new S101 tunnel.

When the first and second networks are other networks, the structure of the inter-network interconnection device is similar to that of the inter-network interconnection device in this example and thus is not further described.

In this embodiment, the inter-network interconnection device is located on the first network; the second tunnel between the inter-network interconnection device and the second inter-network interconnection device on the second network is set up; and the switching from the first tunnel to the second tunnel is triggered when the second tunnel is set up.

Figure 2:
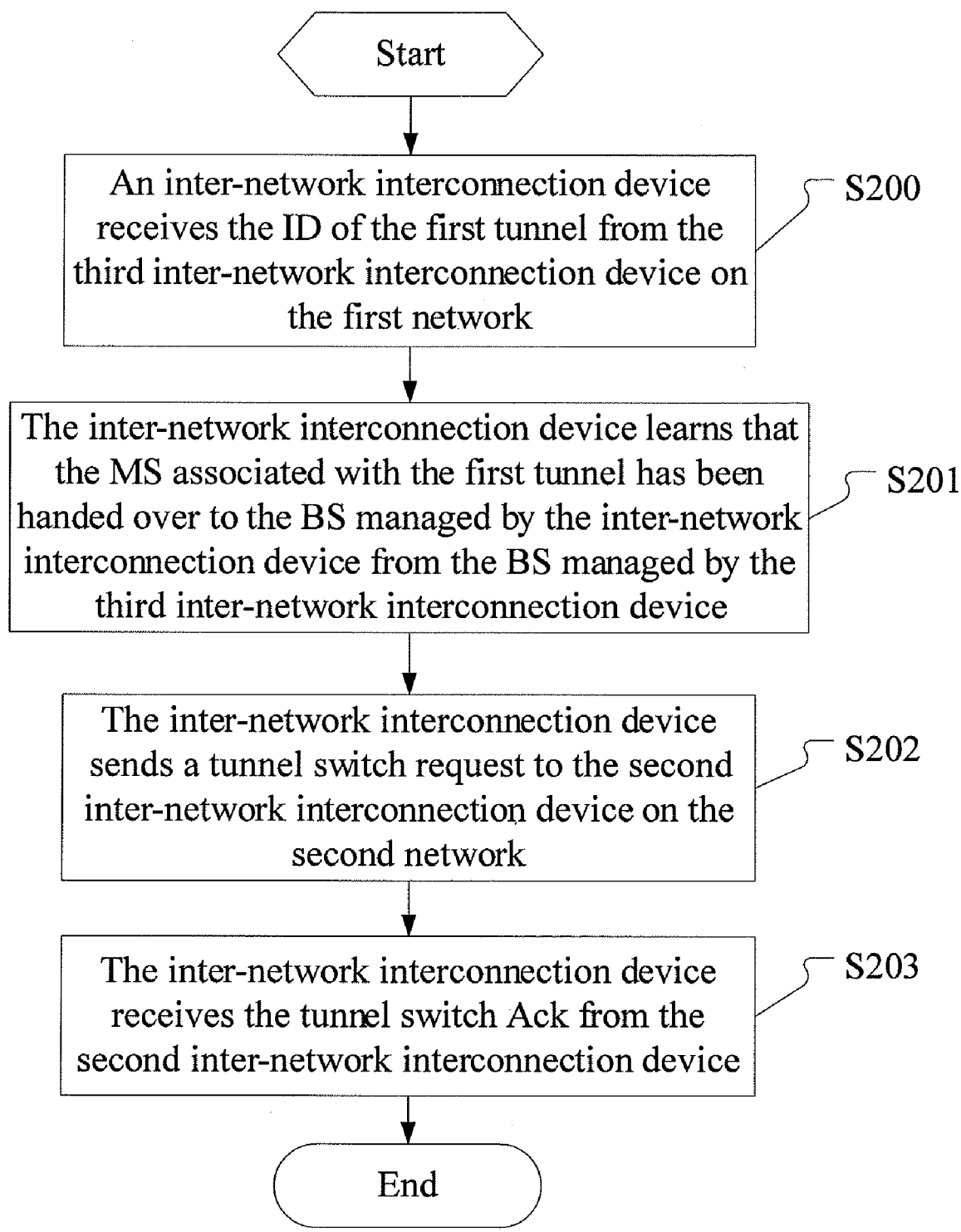
FIG. 2 shows an inter-network tunnel switching method in an embodiment of the present disclosure.

An embodiment of the present disclosure provides an inter-network tunnel switching method. As shown in FIG. 2, the inter-network tunnel switching method includes the following steps:

S200. An inter-network interconnection device receives the ID of the first tunnel from the third inter-network interconnection device on the first network.

S201. The inter-network interconnection device learns that the MS associated with the first tunnel has been handed over to the BS managed by the inter-network interconnection device from the BS managed by the third inter-network interconnection device.

S202. The inter-network interconnection device sends a tunnel switch request to the second inter-network interconnection device on the second network. The tunnel switch request carries the ID of the second tunnel that the inter-network interconnection device allocates to the MS, the ID of the first tunnel, and the ID of the third inter-network interconnection device to instruct the second inter-network interconnection device to set up the second tunnel with the inter-network interconnection device and switch the first tunnel between the second inter-network interconnection device and the third inter-network interconnection device to the second tunnel.

S203. The inter-network interconnection device receives the tunnel switch Ack from the second inter-network interconnection device and determines that the second tunnel to the second inter-network interconnection device is set up and that the first tunnel is switched to the second tunnel.

Further, the second inter-network interconnection device releases the first tunnel after receiving the tunnel switch request from the inter-network interconnection device, and the third inter-network interconnection device releases the first tunnel.

The step for the third inter-network interconnection device to release the first tunnel includes the following substeps:

1. The second inter-network interconnection device sends a message for releasing the first tunnel to the third inter-network interconnection device.

2. The third inter-network interconnection device releases the first tunnel after receiving the message for releasing the first tunnel from the second inter-network interconnection device.

Alternatively, the third inter-network interconnection device releases the first tunnel after confirming that the intra-network handover with the inter-network interconnection device is complete, where the intra-network handover may be MME relocation or AN session transfer.

In a specific implementation, the first or second network may be an evolved 3GPP network (SAE/LTE), an HRPD network, a WLAN, or a WiMAX network. In the same Interconnection network architecture, the first and second networks are different. For example, when the first network is an evolved 3GPP network and the second network is an HRPD network, the inter-network interconnection device and the third inter-network interconnection device are MMEs, and the second inter-network interconnection device is an AN. Optionally, when the first network is an HRPD network and the second network is an evolved 3GPP network, the inter-network interconnection device and the third inter-network interconnection device are ANs, and the second inter-network interconnection device is an MME.

In this embodiment, the inter-network interconnection device on the first network sets up a second tunnel to the second inter-network interconnection device on the second network and triggers the switching from the first tunnel to the second tunnel. The first and second tunnels are configured to forward the signaling between the MS on the first network and the second network. When the second tunnel is set up, the switching from the first tunnel to the second tunnel is triggered, thus avoiding the loss of MS messages. Further, after tunnel switching, the second and third inter-network interconnection devices release the first tunnel, thus avoiding resource deadlock.

Figure 3A:
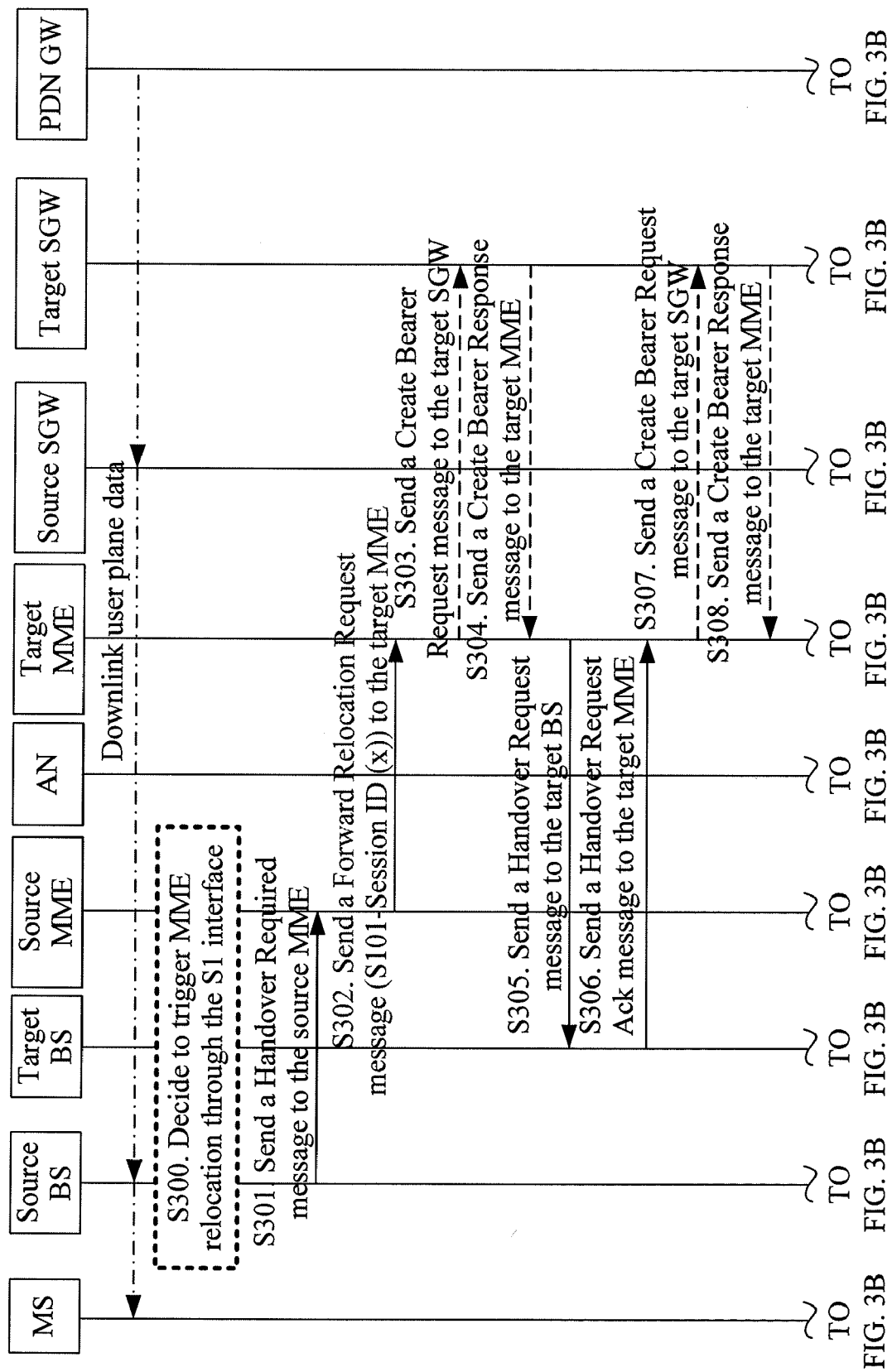
FIG. 3 shows an inter-network tunnel switching method where a first network is an evolved 3GPP network and a second network is an HRPD network in an embodiment of the present disclosure.
Figure 3B:
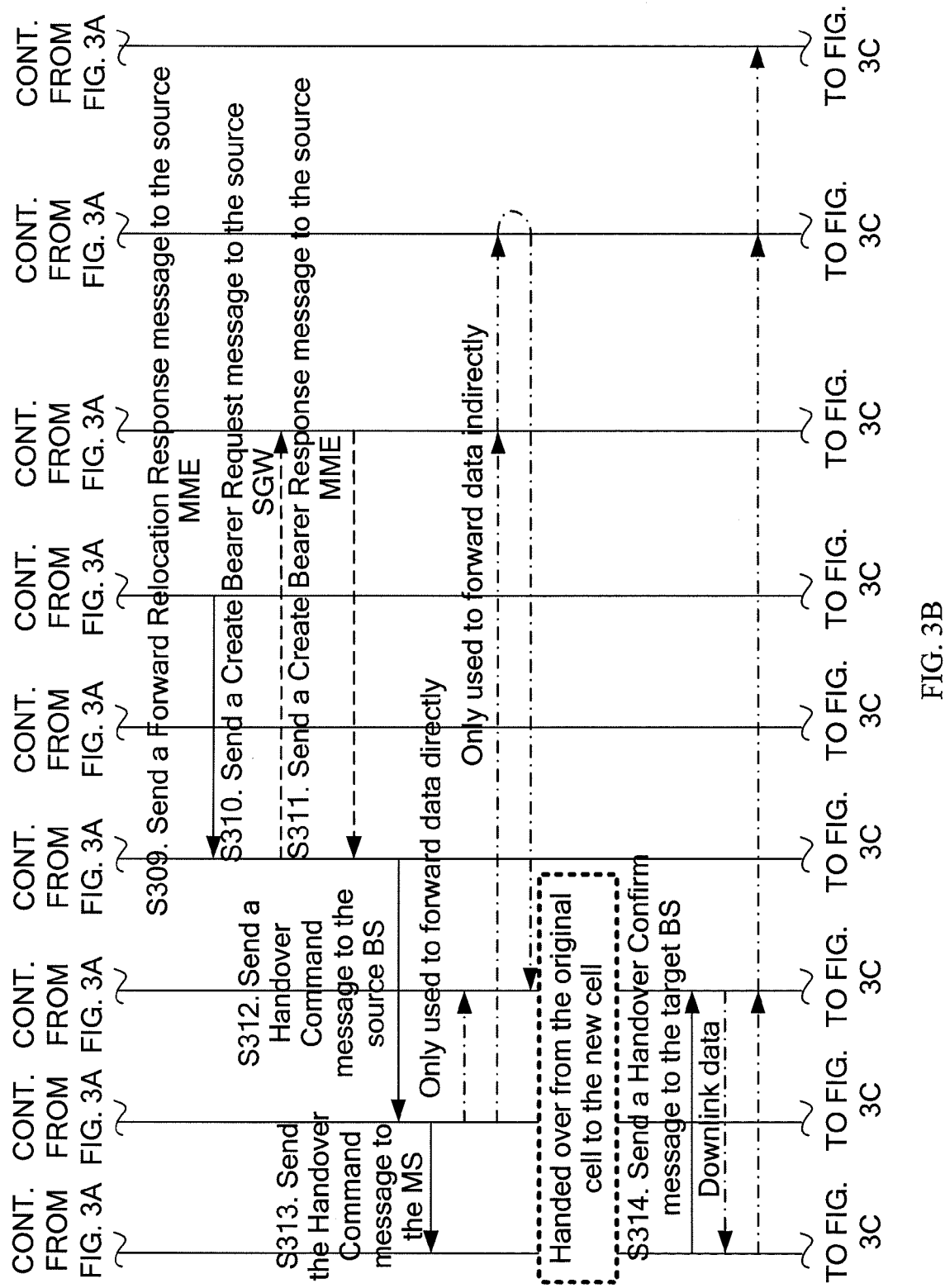
Figure 3C:
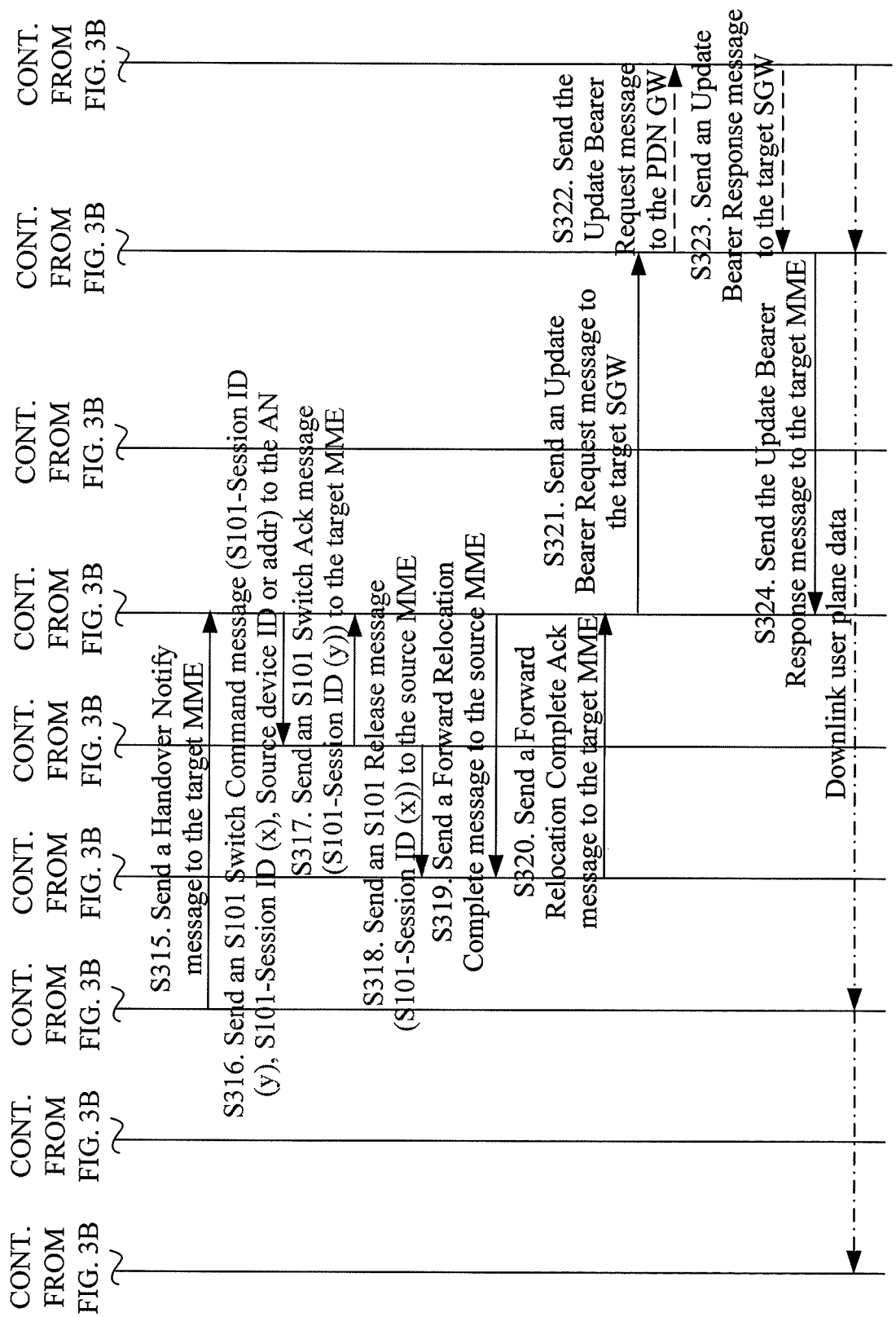

FIG. 3 shows an inter-network tunnel switching method where the first network is an evolved 3GPP network and the second network is an HRPD network. In this embodiment, when the inter-network interconnection device and the third inter-network interconnection device are MMEs and the second inter-network interconnection device is an AN, the first and second tunnels may be S101 tunnels. An MS is located on the evolved 3GPP network and moves to the inter-network interconnection device (hereinafter referred to as the target MME in this embodiment) from the third inter-network interconnection device (hereinafter referred to as the source MME in this embodiment). The MS, however, does not leave the management scope of the second inter-network interconnection device (hereinafter referred to as the AN in this embodiment) associated with the source MME. The source MME enables MME relocation to transfer the contexts of the MS to the target MME, which involves S101 tunnel switching. In this embodiment, the first tunnel may be called a source S101 tunnel and the second tunnel may be called a new S101 tunnel. As shown in FIG. 3, the inter-network tunnel switching method includes the following steps:

S300. The source BS decides to trigger MME relocation through the S1 interface.

S301. The source BS sends a Handover Required message to the source MME.

S302. The source MME sends a Forward Relocation Request message to the target MME. The message carries the ID of the source S101 tunnel and the ID may be represented by S101-Session-ID (x).

S303. The target MME sends a Create Bearer Request message to the target serving gateway (SGW).

S304. The target SGW sends a Create Bearer Response message to the target MME.

S305. The target MME sends a Handover Request message to the target BS.

S306. The target BS sends a Handover Request Ack message to the target MME.

S307. The target MME sends a Create Bearer Request message to the target SGW.

S308. The target SGW sends a Create Bearer Response message to the target MME.

S309. The target MME sends a Forward Relocation Response message to the source MME.

S310. The source MME sends a Create Bearer Request message to the source SGW.

S311. The source SGW sends a Create Bearer Response message to the source MME.

S312. The source MME sends a Handover Command message to the source BS.

S313. The source BS sends the Handover Command message to the MS.

S314. The MS sends a Handover Confirm message to the target BS.

S315. The target BS sends a Handover Notify message to the target MME to notify the target MME that the MS has been handed over to the target BS from the source BS.

S316. The target MME sends an S101 Switch Command message to the AN. The message carries the ID (represented by S101-Session-ID (y)) of the new S101 tunnel that the target MME allocates to the MS, the ID (represented by S101-Session-ID (x)) of the source S101 tunnel, and the ID (represented by the source device ID or IP address) of the source MME to instruct the AN to set up the new S101 tunnel with the target MME and switch the source S101 tunnel between the AN and the source MME to the new S101 tunnel.

S317. The AN sends an S101 Switch Ack message to the target MME. The message carries the ID (represented by S101-Session-ID (y)) of the new S101 tunnel that the target MME allocates to the MS. After receiving the S101 Switch Ack message, the target MME can determine that the new S101 tunnel to the AN has been set up and that the source S101 tunnel has been switched to the new S101 tunnel.

S318. The AN sends an S101 Release message to the source MME. The message carries the ID (represented by S101-Session-ID (x)) of the source S101 tunnel to instruct the source MME to release the source S101 tunnel. Then the AN releases the S101 tunnel.

S319. The target MME sends a Forward Relocation Complete message to the source MME.

Another method for releasing the source S101 tunnel is provided. Specifically, the AN automatically releases the source S101 tunnel after step S317. That is, the AN releases the source S101 tunnel after sending the S101 Switch Ack message to the target MME. The AN does not execute step S318. The source MME, however, automatically releases the source S101 tunnel after step S319. That is, the source MME releases the source S101 tunnel after receiving the Forward Relocation Complete message.

S320. The source MME sends a Forward Relocation Complete Ack message to the target MME.

S321. The target MME sends an Update Bearer Request message to the target SGW.

S322. The target SGW sends the Update Bearer Request message to the packet data network gateway (PDN GW).

S323. The PDN GW sends an Update Bearer Response message to the target SGW.

S324. The target SGW sends the Update Bearer Response message to the target MME.

In this embodiment, the target MME on the evolved 3GPP network sets up a new S101 tunnel to the AN on the HRPD network and triggers the switching from the source S101 tunnel to the new S101 tunnel. This avoids the loss of MS messages. Further, the AN and the source MME release the source S101 tunnel after the source S101 tunnel is switched to the new S101 tunnel, thus avoiding resource deadlock.

Figure 4A:
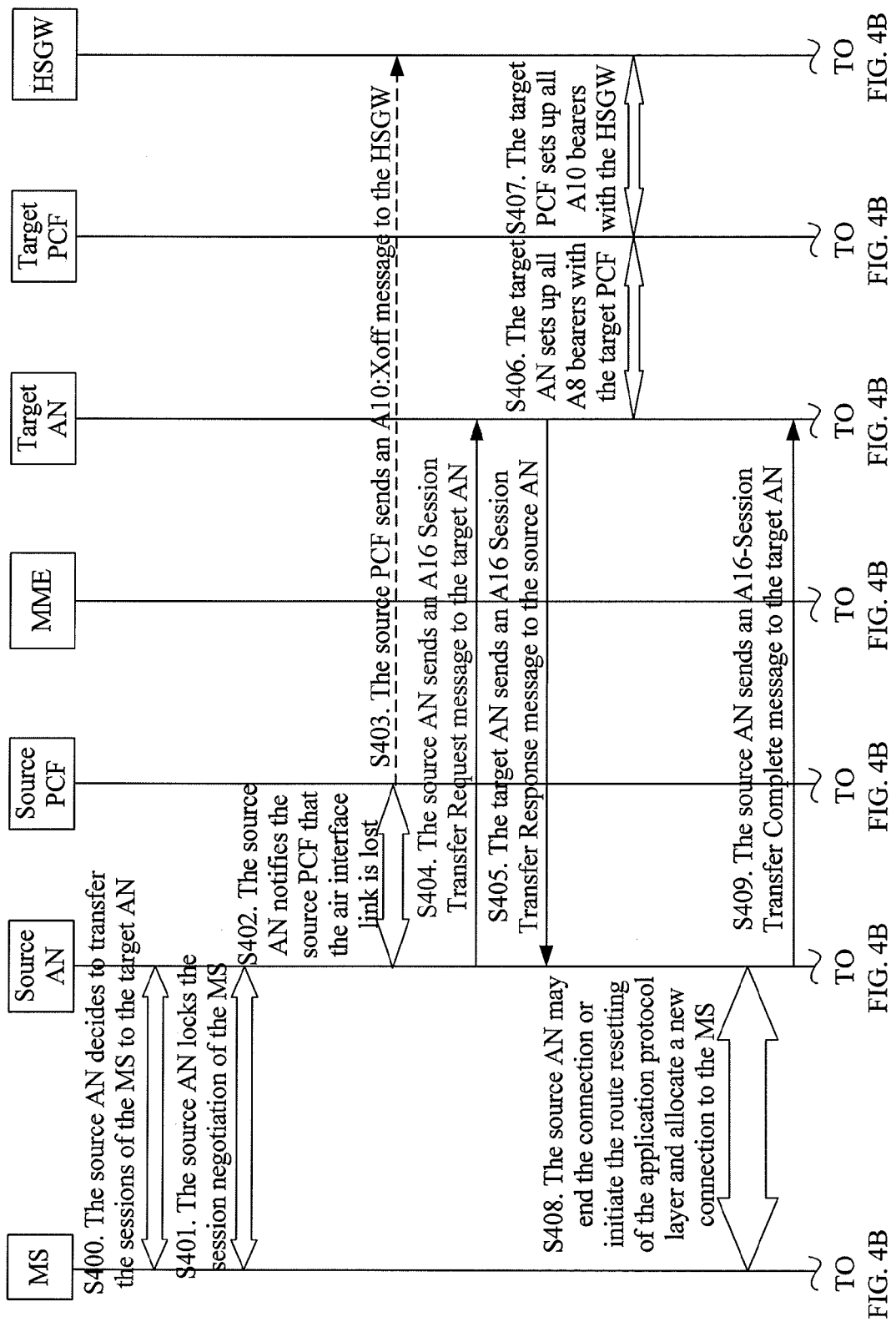
FIG. 4 shows an inter-network tunnel switching method where a first network is an HRPD network and a second network is an evolved 3GPP network in an embodiment of the present disclosure.
Figure 4B:
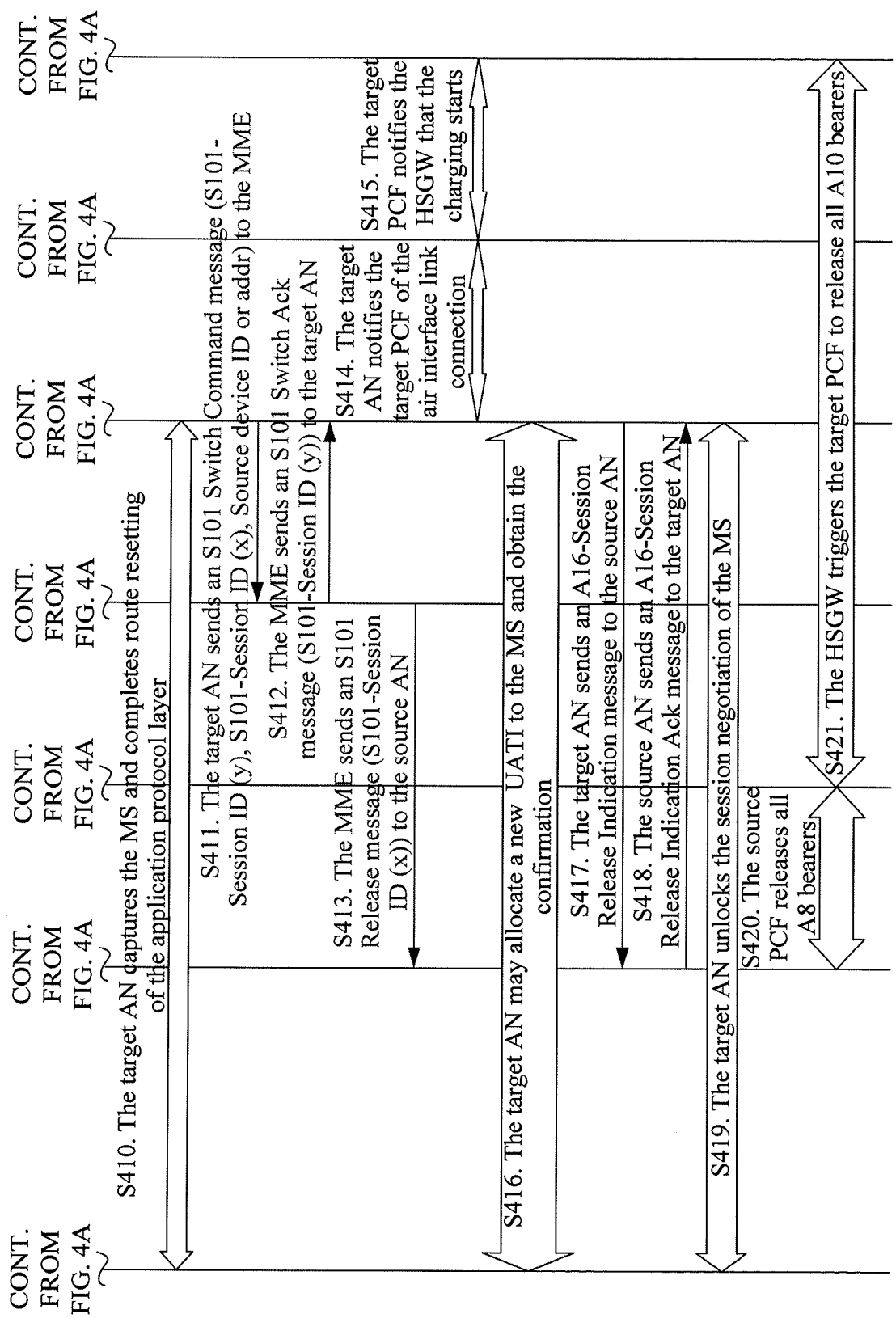

FIG. 4 shows an inter-network tunnel switching method where the first network is an HRPD network and the second network is an evolved 3GPP network. In this embodiment, when the inter-network interconnection device and the third inter-network interconnection device are ANs and the second inter-network interconnection device is an MME, the first and second tunnels are still S101 tunnels. In this case, the MS is located on the HRPD network and moves to the inter-network interconnection device (hereinafter referred to as the target AN in this embodiment) from the third inter-network interconnection device (hereinafter referred to as the source AN in this embodiment). The MS, however, does not leave the management scope of the second inter-network interconnection device (hereinafter referred to as the MME in this example) associated with the source AN. The source AN enables AN session transfer to transfer the sessions of the MS to the target AN, which involves S101 tunnel switching. In this embodiment, the first tunnel may be called a source S101 tunnel and the second tunnel may be called a new S101 tunnel. As shown in FIG. 4, the inter-network tunnel switching method includes the following steps:

S400. The source AN decides to transfer the sessions of the MS to the target AN.

S401. The source AN locks the session negotiation of the MS.

S402. The source AN notifies the source packet control function (PCF) that the air interface link is lost. This step is optional.

S403. The source PCF sends an A10:Xoff message to the HRPD serving gateway (HSGW). This step is optional.

S404. The source AN sends an A16 Session Transfer Request message to the target AN. The message carries the ID of the source S101 tunnel and the ID may be represented by S101-Session-ID (x).

S405. The target AN sends an A16 Session Transfer Response message to the source AN.

S406. The target AN sets up all A8 bearers with the target PCF.

S407. The target PCF sets up all A10 bearers with the HSGW.

S408. The source AN may end the connection or initiate the route resetting of the application protocol layer. At the same time, the source AN allocates a new connection to the MS.

S409. The source AN sends an A16-Session Transfer Complete message to the target AN.

S410. The target AN captures the MS and completes route resetting of the application protocol layer.

S411. The target AN sends an S101 Switch Command message to the MME. The message carries the ID (represented by S101-Session-ID (y)) of the new S101 tunnel that the target AN allocates to the MS, the ID (represented by S101-Session-ID (x)) of the source S101 tunnel, and the ID (represented by the source device ID or IP address) of the source AN to instruct the MME to set up the new S101 tunnel with the target AN and switch the source S101 tunnel between the MME and the source AN to the new S101 tunnel.

S412. The MME sends an S101 Switch Ack message to the target AN. The message carries the ID (represented by S101-Session-ID (y)) of the new S101 tunnel that the target AN allocates to the MS. After receiving the S101 Switch Ack message, the target AN can determine that the new S101 tunnel to the MME has been set up and that the source S101 tunnel has been switched to the new S101 tunnel.

S413. The MME sends an S101 Release message to the source AN. The message carries the ID (represented by S101-Session-ID (x)) of the source S101 tunnel to instruct the source AN to release the source S101 tunnel. Then the MME releases the S101 tunnel.

S414. The target AN notifies the target PCF of the air interface link connection. This step is optional.

S415. The target PCF notifies the HSGW that the charging starts. This step is optional.

S416. The target AN may allocate a new unicast access terminal identity (UATI) to the MS and obtain the confirmation.

S417. The target AN sends an A16-Session Release Indication message to the source AN.

Another method for releasing the source S101 tunnel is provided. Specifically, the MME automatically releases the source S101 tunnel after step S412. That is, the MME releases the source S101 tunnel after sending the S101 Switch Ack message to the target AN. The MME does not execute step S413. The source AN, however, automatically releases the source S101 tunnel after step S417. That is, the source AN learns that the AN session transfer is complete after receiving the A16-Session Release Indication message and thus releases the source S101 tunnel.

S418. The source AN sends an A16-Session Release Indication Ack message to the target AN.

S419. The target AN unlocks the session negotiation of the MS.

S420. The source PCF releases all A8 bearers.

S421. The HSGW triggers the target PCF to release all A10 bearers.

In this embodiment, the target AN on the HRPD network sets up a new S101 tunnel to the MME on the evolved 3GPP network and triggers the switching from the source S101 tunnel to the new S101 tunnel. This avoids the loss of MS messages. Further, the MME and the source AN release the source S101 tunnel after the source S101 tunnel is switched to the new S101 tunnel, thus avoiding resource deadlock.

Figure 5:
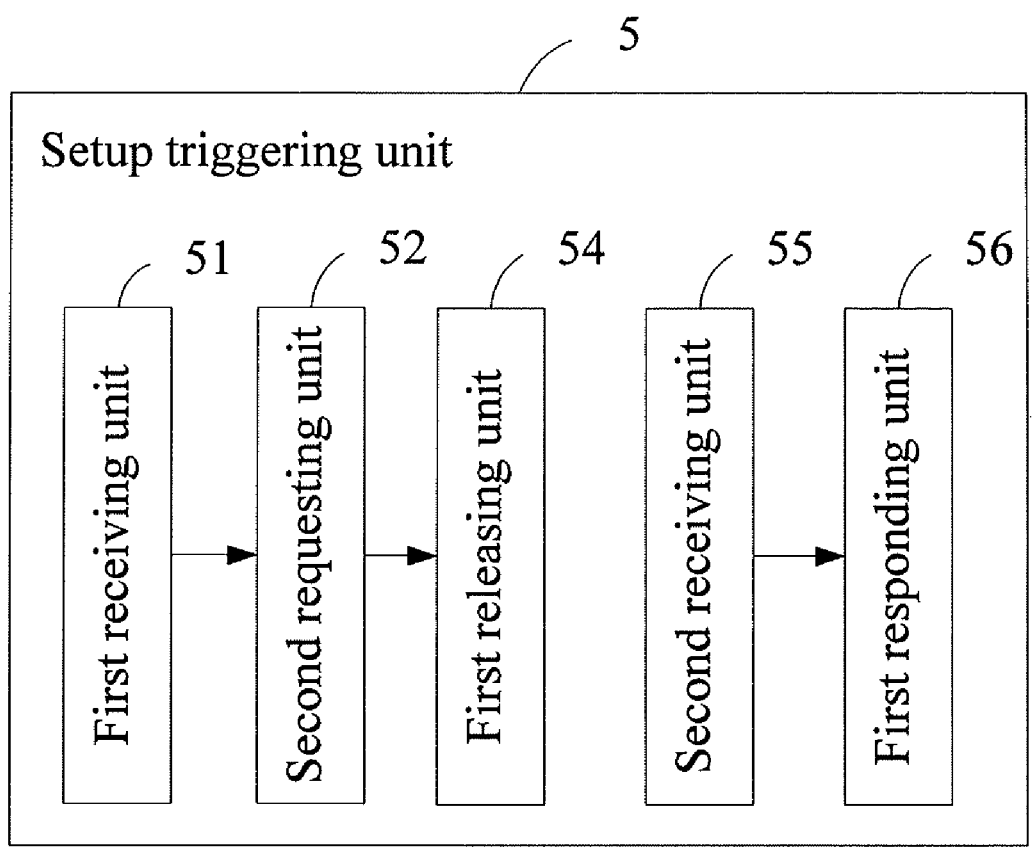
FIG. 5 shows a structure of an inter-network interconnection device in another embodiment of the present disclosure.

An embodiment of the present disclosure provides an inter-network interconnection device. As shown in FIG. 5, the inter-network interconnection device is located on the first network and includes a setup triggering unit 5. The setup triggering unit 5 is configured to set up a second tunnel to the second inter-network interconnection device on the second network and trigger the switching from the first tunnel to the second tunnel. The first and second tunnels are configured to forward the signaling between the MS on the second network and the first network. Further, the setup triggering unit 5 includes a first receiving unit 51, a second requesting unit 52, a first releasing unit 54, a second receiving unit 55, and a first responding unit 56.

The first receiving unit 51 is configured to receive a tunnel switch required request sent from the third inter-network interconnection device on the second network. The tunnel switch required request carries the ID of the first tunnel, the ID of the second inter-network interconnection device, and an MS ID of the MS that the second inter-network interconnection device can identify. The second requesting unit 52 is connected to the first receiving unit 51 and is configured to send a tunnel switch command to the second inter-network interconnection device on the second network. The tunnel switch command carries the ID of the second tunnel that the inter-network interconnection device allocates to the MS and the ID of the MS to instruct the second inter-network interconnection device to set up the second tunnel with the inter-network interconnection device. Then, the inter-network interconnection device stops the interaction with the MS through the first tunnel and triggers the switching from the first tunnel to the second tunnel. The first tunnel is set up between the inter-network interconnection device and the third inter-network interconnection device. The first releasing unit 54 is configured to release the first tunnel after receiving the tunnel switch required request sent from the third inter-network interconnection device or the tunnel switch Ack sent from the second inter-network interconnection device. The second receiving unit 55 is configured to receive a DL Message Prohibited message sent from the third inter-network interconnection device. The DL Message Prohibited message carries the ID of the first tunnel to instruct the inter-network interconnection device to stop sending downlink messages to the MS associated with the first tunnel. After receiving the DL Message Prohibited message, the inter-network interconnection device stops sending downlink message to the MS associated with the first tunnel. The first responding unit 56 is configured to send a DL Message Prohibited Ack message to the third inter-network interconnection device after the second receiving unit receives the DL Message Prohibited message.

In specific implementation, the first or second network may be an evolved 3GPP network (SAE/LTE), an HRPD network, a WLAN, or a WiMAX network. In the same Interconnection network architecture, the first and second networks are different.

For example, when the first network is an evolved 3GPP network and the second network is an HRPD network, the inter-network interconnection device is an MME, and the second and third inter-network interconnection devices are ANs. Optionally, when the first network is an HRPD network and the second network is an evolved 3GPP network, the inter-network interconnection device is an AN, and the second and third inter-network interconnection devices are MMEs.

EXAMPLE 3

When the first network is an HRPD network, the second network is an evolved 3GPP network, the inter-network interconnection device is an AN, and the second and third inter-network interconnection devices are MMEs, the first and second tunnels may be S101 tunnels. In this case, the MS is located on the evolved 3GPP network and moves to the second inter-network interconnection device (hereinafter referred to as the target MME in this example) from the third inter-network interconnection device (hereinafter referred to as the source MME in this example). The MS, however, does not leave the management scope of the inter-network interconnection device (hereinafter referred to as the AN in this example) associated with the source MME. The source MME enables MME relocation to transfer the contexts of the MS to the target MME, which involves S101 tunnel switching. In this example, the first tunnel may be called a source S101 tunnel and the second tunnel may be called a new S101 tunnel. In this case, the first receiving unit 51 of the inter-network interconnection device (AN) may obtain the tunnel switch request from the S101 Switch Required message sent from the source MME. The S101 Switch Required message carries the ID (or address) of the target MME and the MS ID that the target MME can identify. In specific implementation, according to the Forward Relocation Complete message sent from the target MME, the source MME can learn that the MME relocation is complete and that the MS associated with the source S101 tunnel has been handed over to the BS managed by the target MME from the BS managed by the source MME, and then send the tunnel switch required request to the AN. The second requesting unit 52 may send a tunnel switch command to the target MME through the S101 Switch Command message. The S101 Switch Command message carries the ID of the new S101 tunnel that the AN allocates to the MS and the MS ID that the target MME can identify to instruct the target MME to set up the new S101 tunnel with the AN. Then, the AN stops the interaction with the MS through the source S101 tunnel and triggers the switching from the source S101 tunnel to the new S101 tunnel. The source S101 tunnel is set up between the AN and the source MME. The first releasing unit 54 may release the source S101 tunnel after receiving the tunnel switch required request sent from the source MME or the tunnel switch Ack message sent from the target MME. The second receiving unit 55 may receive the DL Message Prohibited message sent from the source MME. The DL Message Prohibited message carries the ID of the source S101 tunnel and the ID may be represented by S101-Session-ID (x). Then, the AN stops sending downlink messages to the MS associated with the first tunnel. The first responding unit 56 may send a DL Message Prohibited Ack message to the source MME to respond to the DL Message Prohibited message.

EXAMPLE 4

When the first network is an evolved 3GPP network, the second network is an HRPD network, the inter-network interconnection device is an MME, and the second and third inter-network interconnection devices are ANs, the first and second tunnels are still S101 tunnels. In this case, the MS is located on the HRPD network and moves to the second inter-network interconnection device (hereinafter referred to as the target AN in this example) from the third inter-network interconnection device (hereinafter referred to as the source AN in this example). The MS, however, does not leave the management scope of the inter-network interconnection device (hereinafter referred to as the MME in this example) associated with the source AN. The source AN enables AN session transfer to transfer the sessions of the MS to the target AN, which involves S101 tunnel switching. In this example, the first tunnel may be called a source S101 tunnel and the second tunnel may be called a new S101 tunnel. In this case, the first receiving unit 51 of the inter-network interconnection device (MME) may obtain the tunnel switch request from the S101 Switch Required message sent from the source AN. The S101 Switch Required message carries the ID (or address) of the target AN and the MS ID that the target AN can identify. In specific implementation, according to the A16-Session Release Indication message that the BS managed by the target AN sends to the target AN, the source AN can learn that the AN session transfer is complete and that the MS associated with the source S101 tunnel has been handed over to the BS managed by the target AN from the BS managed by the source AN, and then send the tunnel switch required request to the MME. The second requesting unit 52 may send a tunnel switch command to the target AN through the S101 Switch Command message. The S101 Switch Command message carries the ID of the new S101 tunnel that the MME allocates to the MS and the MS ID that the target AN can identify to instruct the target AN to set up the new S101 tunnel with the MME. Then, the MME stops the interaction with the MS through the source S101 tunnel and triggers the switching from the source S101 tunnel to the new S101 tunnel. The source S101 tunnel is set up between the MME and the source AN. The first releasing unit 54 may release the source S101 tunnel after receiving the tunnel switch required request sent from the source AN or the tunnel switch Ack message sent from the target AN. The second receiving unit 55 may receive the DL Message Prohibited message sent from the source AN. The DL Message Prohibited message carries the ID of the source S101 tunnel and the ID may be represented by S101-Session-ID (x). Then, the MME stops sending downlink messages to the MS associated with the first tunnel. The first responding unit 56 may send a DL Message Prohibited Ack message to the source AN to respond to the DL Message Prohibited message.

When the first and second networks are other networks, the structure of the inter-network interconnection device is similar to that of the inter-network interconnection device in this example and thus is not further described.

In this embodiment, the inter-network interconnection device is located on the first network; a second tunnel is set up between the inter-network interconnection device and the second inter-network interconnection device on the second network; and the switching from the first tunnel to the second tunnel is triggered when the second tunnel is set up. After tunnel switching is complete, the inter-network interconnection device and the third inter-network interconnection device release the first tunnel.

Figure 6:
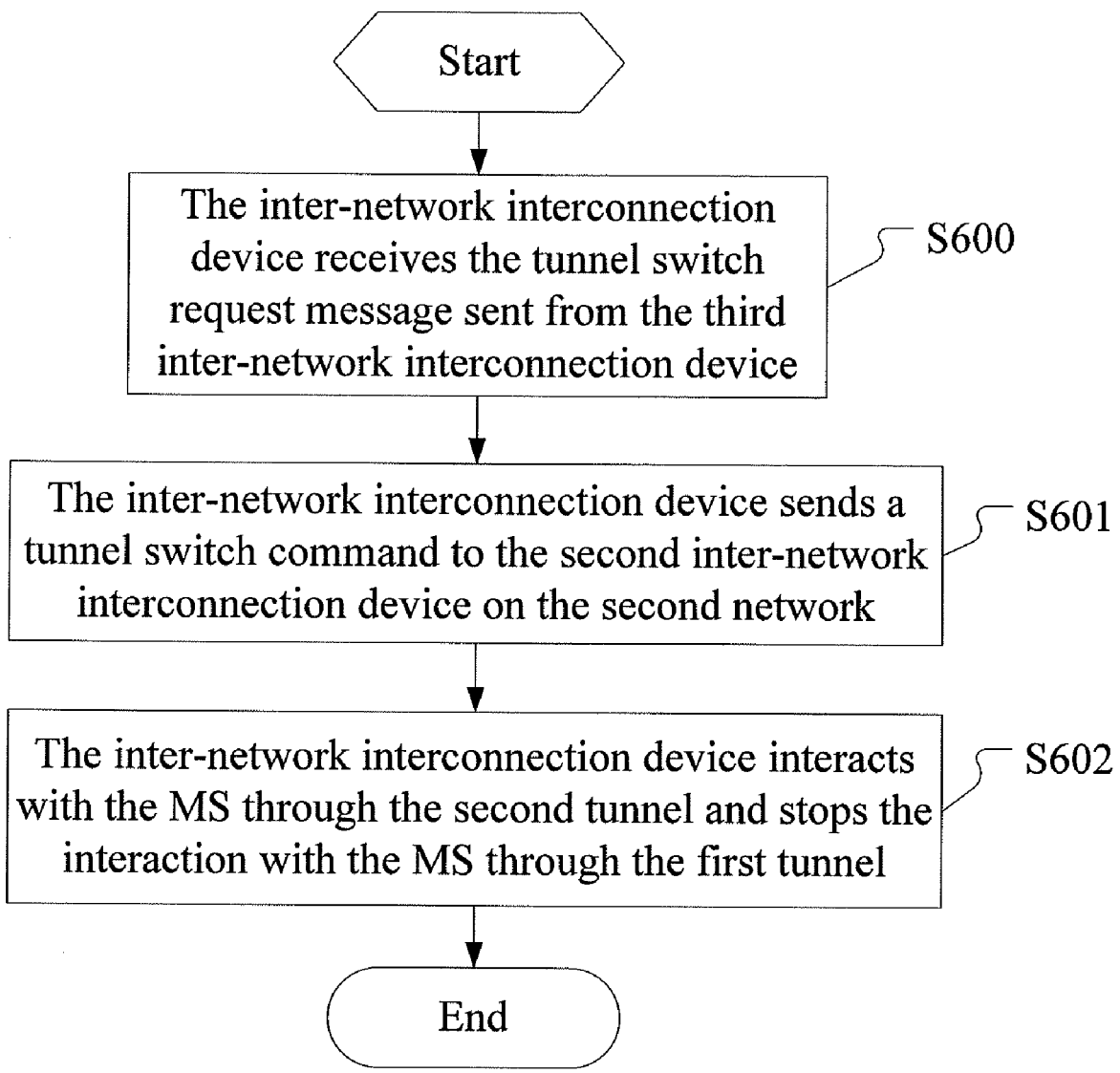
FIG. 6 shows an inter-network tunnel switching method in another embodiment of the present disclosure.

An embodiment of the present disclosure provides an inter-network tunnel switching method. As shown in FIG. 6, the inter-network tunnel switching method includes the following steps:

S600. The inter-network interconnection device receives the tunnel switch required request sent from the third inter-network interconnection device. The message carries the ID of the first tunnel, the ID of the second inter-network interconnection device, and the MS ID that the second inter-network interconnection device can identify.

S601. The inter-network interconnection device sends a tunnel switch command to the second inter-network interconnection device on the second network. The tunnel switch command carries the ID of the second tunnel that the inter-network interconnection device allocates to the MS and the ID of the MS to instruct the second inter-network interconnection device to set up the second tunnel associated with the MS with the inter-network interconnection device.

S602. The inter-network interconnection device interacts with the MS through the second tunnel and stops the interaction with the MS through the first tunnel. In this embodiment, the following steps are further included:

the inter-network interconnection device releases the first tunnel after receiving the tunnel switch required request sent from the third inter-network interconnection device or the tunnel switch command ack sent from the second inter-network interconnection device, and the third inter-network interconnection device releases the first tunnel after receiving the tunnel switch required response sent from the inter-network interconnection device.

Before the third inter-network interconnection device sends the Switch Required message to the inter-network interconnection device, the following steps are included:

the third inter-network interconnection device sends a DL Message Prohibited message to the inter-network interconnection device, where the DL Message Prohibited message carries the ID of the first tunnel;

the inter-network interconnection device stops sending downlink messages to the MS associated with the first tunnel after receiving the DL Message Prohibited message; and the inter-network interconnection device may continue to send downlink messages to the MS after the inter-network tunnel switching is complete, that is, after receiving the tunnel switch Ack message sent from the second inter-network interconnection device.

In specific implementation, the first or second network may be an evolved 3GPP network (SAE/LTE), an HRPD network, a WLAN, or a WiMAX network. In the same Interconnection network architecture, the first and second networks are different. For example, when the first network is an evolved 3GPP network and the second network is an HRPD network, the inter-network interconnection device is an MME, and the second and third inter-network interconnection devices are ANs. Optionally, when the first network is an HRPD network and the second network is an evolved 3GPP network, the inter-network interconnection device is an AN, and the second and third inter-network interconnection devices are MMEs.

In this embodiment, the inter-network interconnection device on the first network sets up a second tunnel to the second inter-network interconnection device on the second network and triggers the switching from the first tunnel to the second tunnel. The first and second tunnels are configured to forward the signaling between the MS on the second network and the first network. When the second tunnel is set up, the switching from the first tunnel to the second tunnel is triggered, thus avoiding the loss of MS messages. Further, after tunnel switching, the inter-network interconnection device and the third inter-network interconnection device release the first tunnel, thus avoiding resource deadlock.

Figure 7A:
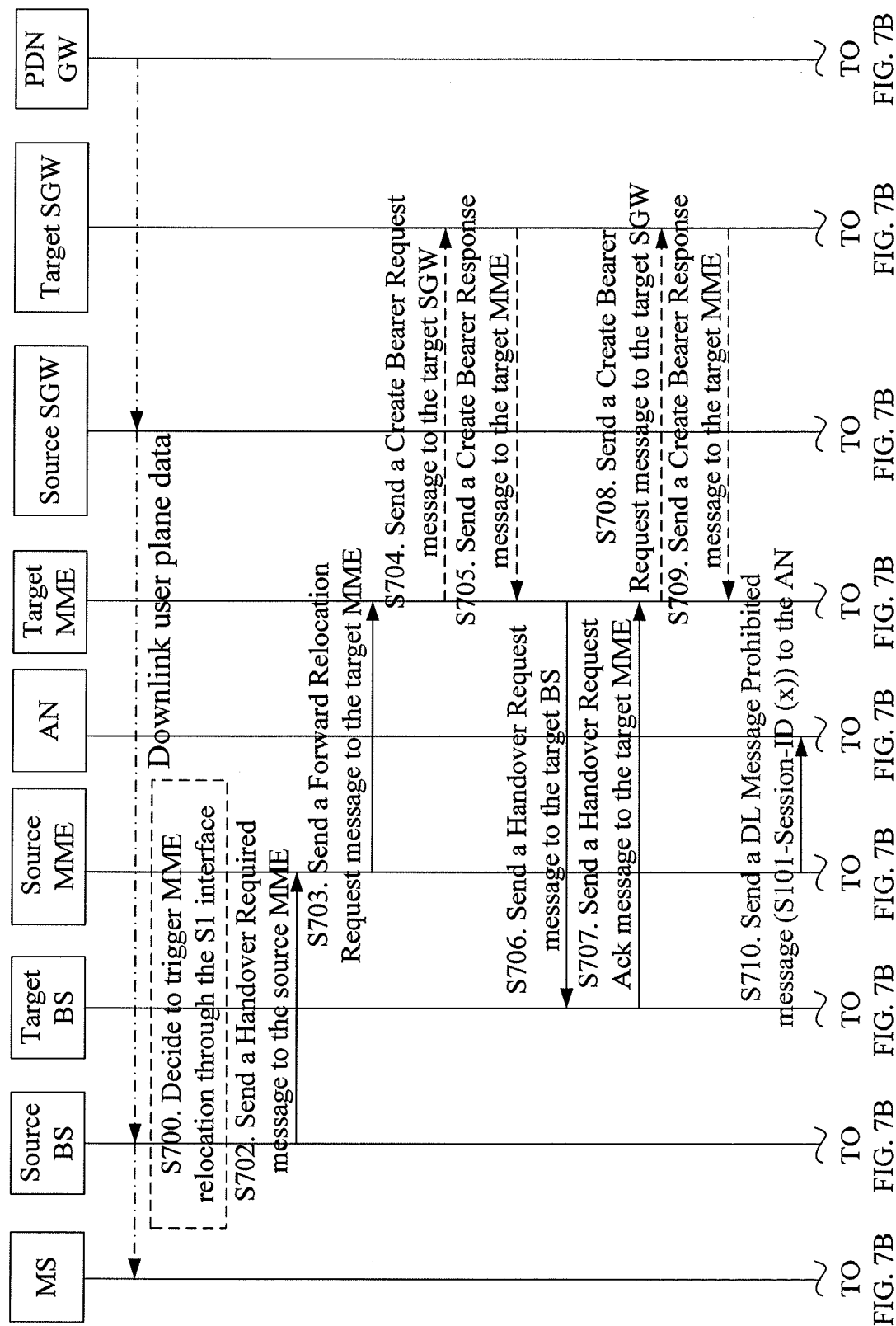
FIG. 7 shows an inter-network tunnel switching method where a first network is an HRPD network and a second network is an evolved 3GPP network in another embodiment of the present disclosure.
Figure 7B:
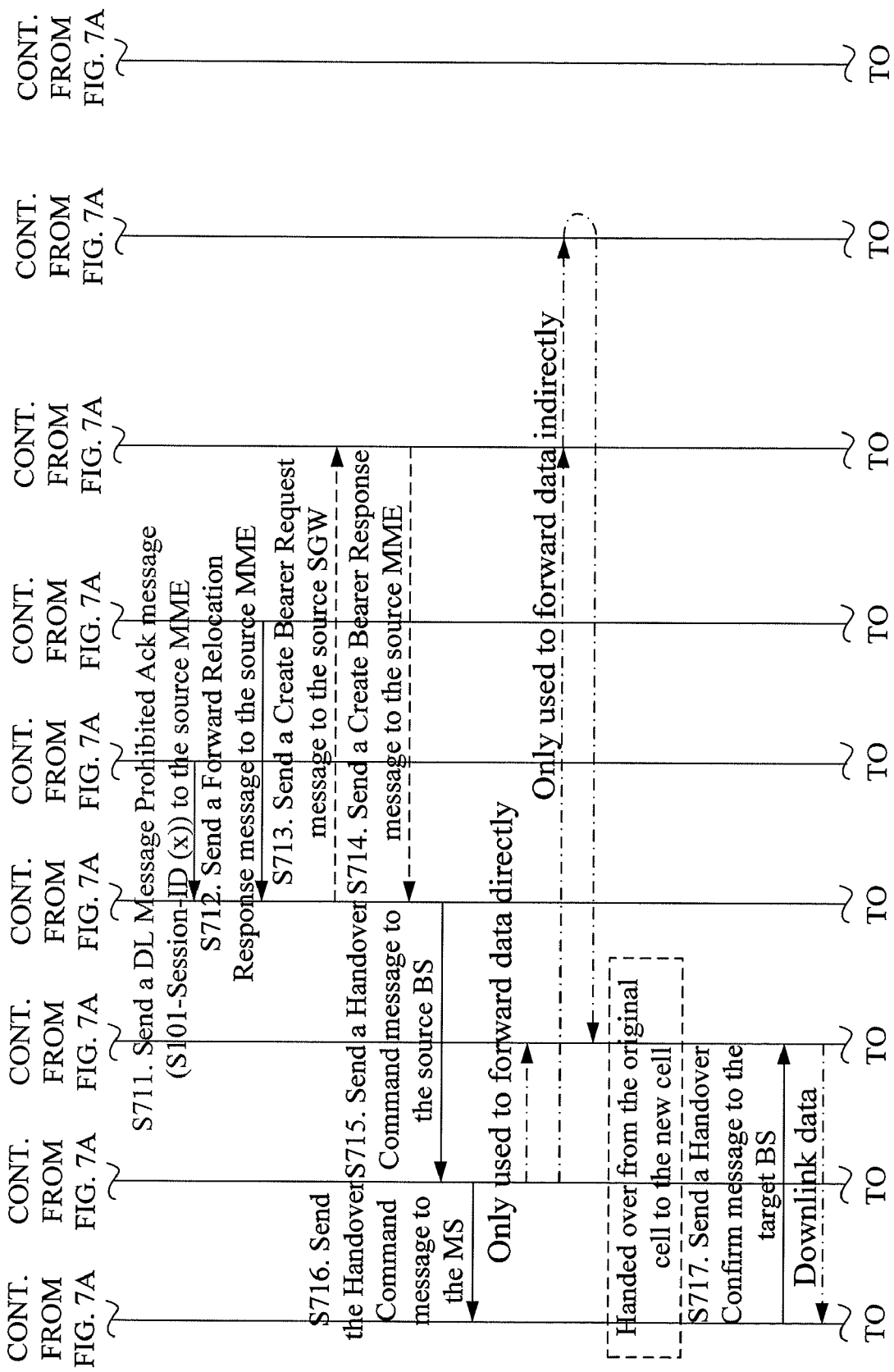
Figure 7C:
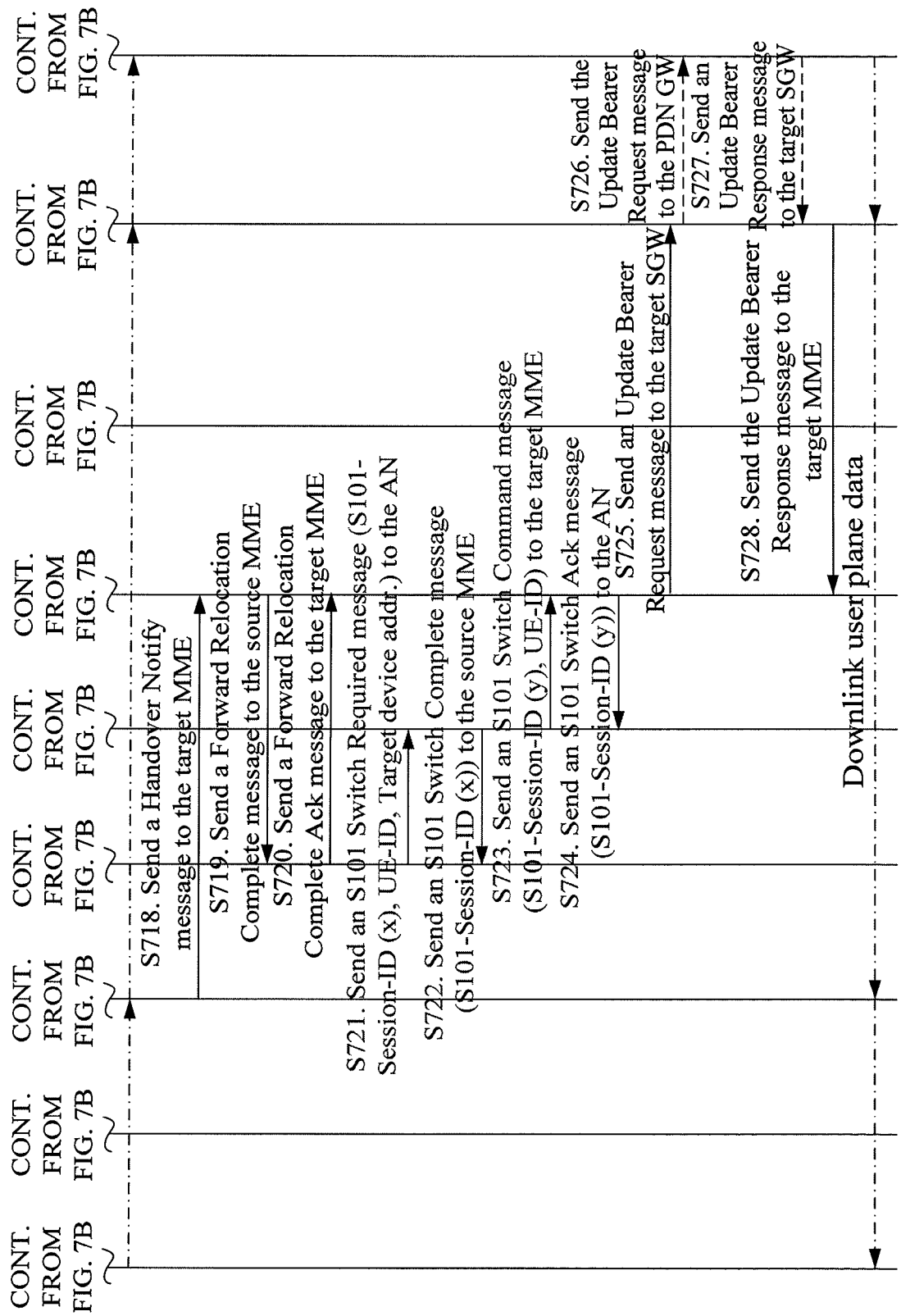

FIG. 7 shows an inter-network tunnel switching method where the first network is an HRPD network and the second network is an evolved 3GPP network. In this embodiment, when the inter-network interconnection device is an AN, and the second and third inter-network interconnection devices are MMEs, the first and second tunnels may be S101 tunnels.

In this case, the MS is located on the evolved 3GPP network and moves to the second inter-network interconnection device (hereinafter referred to as the target MME in this embodiment) from the third inter-network interconnection device (hereinafter referred to as the source MME in this embodiment). The MS, however, does not leave the management scope of the inter-network interconnection device (hereinafter referred to as the AN in this embodiment) associated with the source MME. The source MME enables MME relocation to transfer the contexts of the MS to the target MME, which involves S101 tunnel switching. In this embodiment, the first tunnel may be called a source S101 tunnel and the second tunnel may be called a new S101 tunnel. As shown in FIG. 7, the inter-network tunnel switching method includes the following steps:

S700. The source BS decides to trigger MME relocation through the S1 interface.

S702. The source BS sends a Handover Required message to the source MME.

S703. The source MME sends a Forward Relocation Request message to the target MME.

S704. The target MME sends a Create Bearer Request message to the target SGW.

S705. The target SGW sends a Create Bearer Response message to the target MME.

S706. The target MME sends a Handover Request message to the target BS.

S707. The target BS sends a Handover Request Ack message to the target MME.

S708. The target MME sends a Create Bearer Request message to the target SGW.

S709. The target SGW sends a Create Bearer Response message to the target MME.

S710. The source MME sends a DL Message Prohibited message to the AN to request the AN to stop sending downlink messages to the MS The message carries the ID of the source S101 tunnel and the ID may be represented by S101-Session-ID (x). This step is optional.

S711. The AN sends a DL Message Prohibited Ack message to the source MME to respond to the DL Message Prohibited message. The DL Message Prohibited Ack message carries the ID of the source S101 tunnel and the ID may be represented by S101-Session-ID (x).

S712. The target MME sends a Forward Relocation Response message to the source MME.

S713. The source MME sends a Create Bearer Request message to the source SOW.

S714. The source SGW sends a Create Bearer Response message to the source MME.

S715. The source MME sends a Handover Command message to the source BS.

S716. The source BS sends the Handover Command message to the MS.

S717. The MS sends a Handover Confirm message to the target BS.

S718. The target BS sends a Handover Notify message to the target MME to notify the target MME that the MS has been handed over to the BS managed by the target MME from the BS managed by the source MME.

S719. The target MME sends a Forward Relocation Complete message to the source MME to notify the source MME that the MS has been handed over to the BS managed by the target MME from the BS managed by the source MME.

S720. The source MME sends a Forward Relocation Complete Ack message to the target MME.

S721. The source MME sends an S101 Switch Required message to the AN. The message carries the ID (represented by S101-Session-ID (x)) of the source S101 tunnel, the ID or address of the target MME, and the MS ID that the MME can identify.

S722. The AN sends an S101 Switch Complete message to the source MME to respond to the S101 Switch Required message. The S101 Switch Complete message carries the ID of the source S101 tunnel and the ID may be represented by S101-Session-ID (x). After receiving the S101 Switch Complete message, the source MME may release the source S101 tunnel.

S723. The AN sends an S101 Switch Command message to the target MME. The message carries the ID (represented by S101-Session-ID (y)) of the new S101 tunnel that the AN allocates to the MS and the MS ID that the target MME can identify to instruct the target MME to set up the new S101 tunnel with the AN and switch the source S101 tunnel to the new S101 tunnel. According to the MS ID, the target MME may associate the message that the MS sends to the AN with the new S101 tunnel.

S724. The target MME sends a S101 Switch Command Ack message to the AN. The message carries the ID of the new S101 tunnel and the ID may be represented by S101-Session-ID (y). After receiving the S101 Switch Command Ack message, the AN can determine that the new S101 tunnel has been set up.

S725. The target MME sends an Update Bearer Request message to the target SGW.

S726. The target SGW sends the Update Bearer Request message to the PDN GW.

S727. The PDN GW sends an Update Bearer Response message to the target SGW.

S728. The target SGW sends the Update Bearer Response message to the target MME.

In implementation, two methods are provided for the AN to release the source S101 tunnel. In the first method, the AN releases the source S101 tunnel after receiving the tunnel switch required request sent from the source MME in step S721. In the second method, the AN releases the source S101 tunnel after receiving the switch command Ack message sent from the target MME in step S724.

In this embodiment, the AN on the HRPD network sets up a new S101 tunnel to the target MME on the evolved 3GPP network and triggers the switching from the source S101 tunnel to the new S101 tunnel. This avoids the loss of MS messages. Further, the AN and the source MME release the source S101 tunnel after the source S101 tunnel is switched to the new S101 tunnel, thus avoiding resource deadlock.

Figure 8A:
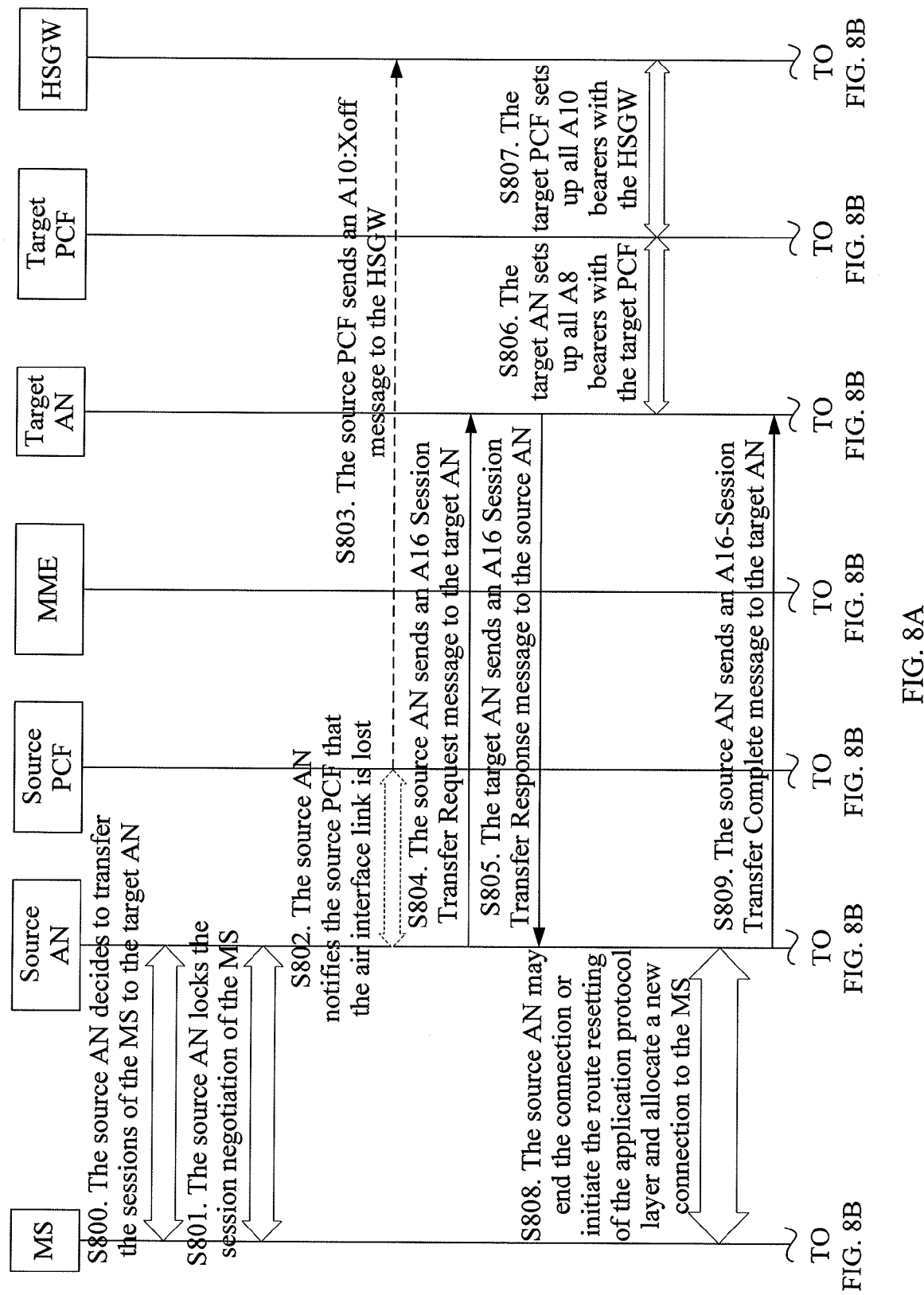
FIG. 8 shows an inter-network tunnel switching method where a first network is an evolved 3GPP network and a second network is an HRPD network in another embodiment of the present disclosure.
Figure 8B:
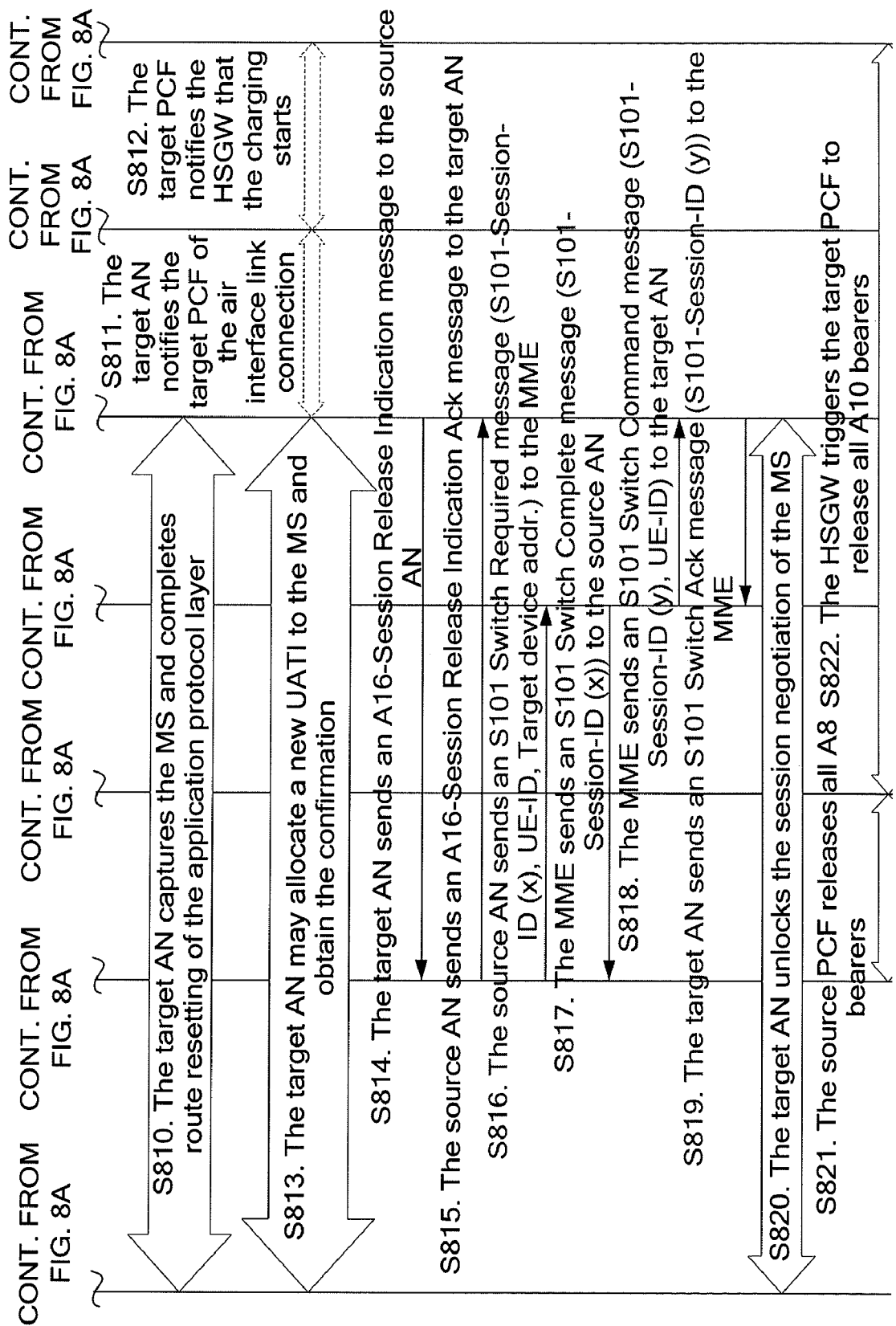

FIG. 8 shows an inter-network tunnel switching method where the first network is an evolved 3GPP network and the second network is an HRPD network. In this embodiment, when the inter-network interconnection device is an MME, and the second and third inter-network interconnection devices are ANs, the first and second tunnels are still S101 tunnels. In this case, the MS is located on the HRPD network and moves to the second inter-network interconnection device (hereinafter referred to as the target AN in this embodiment) from the third inter-network interconnection device (hereinafter referred to as the source AN in this embodiment). The MS, however, does not leave the management scope of the inter-network interconnection device (hereinafter referred to as the MME in this embodiment) associated with the source AN. The source AN enables AN session transfer to transfer the sessions of the MS to the target AN, which involves S101 tunnel switching. In this embodiment, the first tunnel may be called a source S101 tunnel and the second tunnel may be called a new S101 tunnel. As shown in FIG. 8, the inter-network tunnel switching method includes the following steps:

S800. The source AN decides to transfer the sessions of the MS to the target AN.

S801. The source AN locks the session negotiation of the MS.

S802. The source AN notifies the source PCF that the air interface link is lost. This step is optional.

S803. The source PCF sends an A10:Xoff message to the HSGW. This step is optional.

S804. The source AN sends an A16 Session Transfer Request message to the target AN. The message carries the ID of the source S101 tunnel and the ID may be represented by S101-Session-ID (x).

S805. The target AN sends an A16 Session Transfer Response message to the source AN.

S806. The target AN sets up all A8 bearers with the target PCF.

S807. The target PCF sets up all A10 bearers with the HSGW.

S808. The source AN may end the connection or initiate route resetting of the application protocol layer. At the same time, the source AN allocates a new connection to the MS.

S809. The source AN sends an A16-Session Transfer Complete message to the target AN.

S810. The target AN captures the MS and completes route resetting of the application protocol layer.

S811. The target AN notifies the target PCF of the air interface link connection. This step is optional.

S812. The target PCF notifies the HSGW that the charging starts. This step is optional.

S813. The target AN may allocate a new UATI to the MS and obtain the confirmation.

S814. The target AN sends an A16-Session Release Indication message to the source AN.

S815. The source AN sends an A16-Session Release Indication Ack message to the target AN.

S816. The source AN sends an S101 Switch Required message to the MME. The message carries the ID of the source S101 tunnel and the ID may be represented by S101-Session-ID (x).

S817. The MME sends an S101 Switch Complete message to the source AN to respond to the S101 Switch Required message. The S101 Switch Complete message carries the ID of the source S101 tunnel and the ID may be represented by S101-Session-ID (x). After receiving the S101 Switch Complete message, the source AN may release the source S101 tunnel.

S818. The MME sends an S101 Switch Command message to the target AN. The message carries the ID (represented by S101-Session-ID (y)) of the new S101 tunnel that the MME allocates to the MS and the MS ID that the target AN can identify to instruct the target AN to set up the new S101 tunnel with the MME and switch the source S101 tunnel to the new S101 tunnel. According to the MS ID, the target AN may associate the message that the MS sends to the MME with the new S101 tunnel.

S819. The target AN sends a S101 Switch Command Ack message to the MME. The message carries the ID of the new S101 tunnel and the ID may be represented by S101-Session-ID (y). After receiving the S101 Switch Command Ack message, the MME can determine that the new S101 tunnel has been set up.

S820. The target AN unlocks the session negotiation of the MS.

S821. The source PCF releases all A8 bearers.

S822. The HSGW triggers the target PCF to release all A10 bearers.

In implementation, two methods are provided for the MME to release the source S101 tunnel. In the first method, the MME releases the source S101 tunnel after receiving the tunnel switch required request sent from the source AN in step S721. In the second method, the MME releases the source S101 tunnel after receiving the switch command Ack message sent from the target AN in step S724.

In this embodiment, the MME on the evolved 3GPP network sets up a new S101 tunnel to the target AN on the HRPD network and triggers the switching from the source S101 tunnel to the new S101 tunnel. This avoids the loss of MS messages. Further, the MME and the source AN release the source S101 tunnel after the source S101 tunnel is switched to the new S101 tunnel, thus avoiding resource deadlock.

The above descriptions are merely exemplary embodiments of the present disclosure, and are not intended to limit the scope of the present disclosure. Any modification, equivalent replacement, or improvement made according to the appended claims of the present disclosure should fall within the scope of the present disclosure.

What is claimed is:

1. An inter-network tunnel switching method, comprising:
setting up, by a first inter-network interconnection device on a first network, a second tunnel between the first inter-network interconnection device and a second inter-network interconnection device on a second network and triggering switching from a first tunnel to the second tunnel,
wherein the first and second tunnels are configured to forward signaling between a mobile station (MS) on the first network and the second network or between an MS on the second network and the first network;
wherein the setting up, by the first inter-network interconnection device, the second tunnel between the first inter-network interconnection device and the second inter-network interconnection device and triggering the switching from the first tunnel to the second tunnel comprises:
obtaining, by the first inter-network interconnection device, an ID of the first tunnel from a third inter-network interconnection device on the first network;
learning, by the first inter-network interconnection device, that an MS associated with the first tunnel has been handed over to a base station (BS) managed by the first inter-network interconnection device from a BS managed by the third inter-network interconnection device; and
sending, by the first inter-network interconnection device, a tunnel switch request to the second inter-network interconnection device on the second network, wherein the tunnel switch request carries indication information of the ID of the first tunnel to instruct the second inter-network interconnection device to set up the second tunnel with the first inter-network interconnection device and switch the first tunnel between the second inter-network interconnection device and the third inter-network interconnection device to the second tunnel.

2. The method of claim 1, wherein the sending the tunnel switch request to the second inter-network interconnection device on the second network by the first inter-network interconnection device comprises:
sending, by the first inter-network interconnection device, the tunnel switch request to the second inter-network interconnection device on the second network, wherein the tunnel switch request carries an ID of the second tunnel that the first inter-network interconnection device allocates to the MS, the ID of the first tunnel, and an ID of the third inter-network interconnection device to instruct the second inter-network interconnection device to set up the second tunnel with the first inter-network interconnection device and switch the first tunnel between the second inter-network interconnection device and the third inter-network interconnection device to the second tunnel.

3. The method of claim 1, further comprising:
releasing, by the second inter-network interconnection device, the first tunnel after receiving the tunnel switch request from the first inter-network interconnection device; and
releasing, by the third inter-network interconnection device, the first tunnel.

4. The method of claim 3, wherein the releasing, by the third inter-network interconnection device, the first tunnel comprises:
sending, by the second inter-network interconnection device, a message for releasing the first tunnel to the third inter-network interconnection device;
releasing, by the third inter-network interconnection device, the first tunnel after receiving the message for releasing the first tunnel from the second inter-network interconnection device; or
releasing, by the third inter-network interconnection device, the first tunnel after confirming that intra-network handover with the first inter-network interconnection device is complete.

5. The method of claim 1, wherein:
the first inter-network interconnection device and the third inter-network interconnection device are mobility management entities (MMES), and the second inter-network interconnection device is an access network (AN) when the first network is an evolved Third Generation Partnership Project (3GPP) network and the second network is a high rate packet data (HRPD) network; or
the first inter-network interconnection device and the third inter-network interconnection devices are ANs, and the second inter-network interconnection device is an MME when the first network is an HRPD network and the second network is an evolved 3GPP network.

6. An inter-network tunnel switching method, comprising:
setting up, by a first inter-network interconnection device on a first network, a second tunnel between the first inter-network interconnection device and a second inter-network interconnection device on a second network and triggering switching from a first tunnel to the second tunnel,
wherein the first and second tunnels are configured to forward signaling between a mobile station (MS) on the first network and the second network or between an MS on the second network and the first network;
wherein the setting up, by the first inter-network interconnection device, the second tunnel between the first inter-network interconnection device and the second inter-network interconnection device and triggering the switching from the first tunnel to the second tunnel comprises:
receiving, by the first inter-network interconnection device, a tunnel switch required request sent from a third inter-network interconnection device on the second network, wherein the tunnel switch required request carries an ID of the first tunnel, an ID of the second inter-network interconnection device, and an MS ID of an MS that the second inter-network interconnection device can identify;
sending, by the first inter-network interconnection device, a tunnel switch command to the second inter-network interconnection device, wherein the tunnel switch command carries an ID of the second tunnel that the first inter-network interconnection device allocates to the MS and the ID of the MS to instruct the second inter-network interconnection device to set up the second tunnel associated with the MS with the first inter-network interconnection device; and
interacting, by the first inter-network interconnection device, with the MS through the second tunnel and stopping the interaction with the MS through the first tunnel between the third inter-network interconnection device on the second network and the first inter-network interconnection device on the first network.

7. The method of claim 6, further comprising:
releasing, by the first inter-network interconnection device, the first tunnel after receiving the tunnel switch required request sent from the third inter-network interconnection device; and
releasing, by the third inter-network interconnection device, the first tunnel.

8. The method of claim 7, wherein the releasing, by the third inter-network interconnection device, the first tunnel comprises:
releasing, by the third inter-network interconnection device, the first tunnel after the first inter-network interconnection device sends a tunnel switch required response to the third inter-network interconnection device.

9. The method of claim 6, before the third inter-network interconnection device sends a tunnel switch required request to the first inter-network interconnection device, further comprising:
sending, by the third inter-network interconnection device, a Downlink (DL) Message Prohibited message to the first inter-network interconnection device; and
stopping, by the first inter-network interconnection device, sending downlink messages to the MS associated with the first tunnel after receiving the DL Message Prohibited message.

10. The method of claim 6, wherein:
the first inter-network interconnection device is a mobility management entity (MME), and the second and third inter-network interconnection devices are access networks (ANs) if the first network is an evolved Third Generation Partnership Project (3GPP) network and the second network is a high rate packet data (HRPD) network; or
the first inter-network interconnection device is an AN, and the second and third inter-network interconnection devices are MMEs if the first network is an HRPD network and the second network is an evolved 3GPP network.

11. A first inter-network interconnection device, wherein the first inter-network interconnection device is located on a first network and comprises:
a setup triggering unit, configured to set up a second tunnel between the first inter-network interconnection device on the first network and a second inter-network interconnection device on a second network and trigger switching from a first tunnel to the second tunnel, wherein the first and second tunnels are configured to forward signaling between a mobile station (MS) on the first network and the second network or between an MS on the second network and the first network;
wherein the setup triggering unit comprises:
a first obtaining unit, configured to obtain an ID of the first tunnel from a third inter-network interconnection device on the first network;
a first learning unit, configured to learn that an MS associated with the first tunnel has been handed over to a base station (BS) managed by the first inter-network interconnection device from a BS managed by the third inter-network interconnection device; and
a first requesting unit, connected to the first obtaining unit and the first learning unit and configured to send a tunnel switch request to the second inter-network interconnection device on the second network, wherein the tunnel switch request carries indication information of the ID of the first tunnel to instruct the second inter-network interconnection device to set up the second tunnel with the first inter-network interconnection device and switch the first tunnel between the second inter-network interconnection device and the third inter-network interconnection device to the second tunnel.

12. The first inter-network interconnection device of claim 11, wherein the first requesting unit is configured to send the tunnel switch request to the second inter-network interconnection device on the second network, wherein the tunnel switch request carries an ID of the second tunnel that the first inter-network interconnection device allocates to the MS, the ID of the first tunnel, and an ID of the third inter-network interconnection device to instruct the second inter-network interconnection device to set up the second tunnel with the first inter-network interconnection device and switch the first tunnel between the second inter-network interconnection device and the third inter-network interconnection device to the second tunnel.

13. The first inter-network interconnection device of claim 11, wherein:
the first inter-network interconnection device and the third inter-network interconnection device are mobility management entities (MMEs), and the second inter-network interconnection device is an access network (AN) if the first network is an evolved Third Generation Partnership Project (3GPP) network and the second network is a high rate packet data (HRPD) network; or
the first inter-network interconnection device and the third inter-network interconnection device are ANs, and the second inter-network interconnection device is an MME if the first network is an HRPD network and the second network is an evolved 3GPP network.

14. A first inter-network interconnection device, wherein the first inter-network interconnection device is located on a first network and comprises:
a setup triggering unit, configured to set up a second tunnel between the first inter-network interconnection device on the first network and a second inter-network interconnection device on a second network and trigger switching from a first tunnel to the second tunnel, wherein the first and second tunnels are configured to forward signaling between a mobile station (MS) on the first network and the second network or between an MS on the second network and the first network;
wherein the setup triggering unit comprises:
a first receiving unit, configured to receive a tunnel switch required request sent from a third inter-network interconnection device on the second network, wherein the tunnel switch required request carries an ID of the first tunnel, an ID of the second inter-network interconnection device, and an MS ID of an MS that the second inter-network interconnection device can identify, and the second inter-network interconnection device is located on the second network; and
a second requesting unit, configured to send a tunnel switch command to the second inter-network interconnection device on the second network, wherein the tunnel switch command carries an ID of the second tunnel that the first inter-network interconnection device allocates to the MS and the ID of the MS to instruct the second inter-network interconnection device to set up the second tunnel with the first inter-network interconnection device.

15. The first inter-network interconnection device of claim 14, further comprising:
a first releasing unit, configured to release the first tunnel after receiving the tunnel switch required request sent from the third inter-network interconnection device.

16. The first inter-network interconnection device of claim 14, further comprising:
a second receiving unit, configured to receive a Downlink (DL) Message Prohibited message sent from the third inter-network interconnection device, wherein the DL Message Prohibited message carries the ID of the first tunnel to instruct the first inter-network interconnection device to stop sending downlink messages to the MS associated with the first tunnel.

17. The first inter-network interconnection device of claim 14, wherein:
the first inter-network interconnection device is a mobility management entity (MME), and the second and third inter-network interconnection devices are access networks (ANs) when the first network is an evolved Third Generation Partnership Project (3GPP) network and the second network is a high rate packet data (HRPD) network; or
the first inter-network interconnection device is an AN and the second and third inter-network interconnection devices are MMEs when the first network is an HRPD network and the second network is an evolved 3GPP network.

18. An inter-network tunnel switching method, comprising:
setting up, by a first inter-network interconnection device on a first network, a second tunnel between the first inter-network interconnection device and a second inter-network interconnection device on a second network, wherein the first and the second inter-network interconnection devices are selected from one of an access network (AN) and a mobility management entity (MME), and performing triggering switching by one of the first and the second inter-network interconnection devices from a first tunnel to the second tunnel,
wherein the first and second tunnels are configured to forward signaling between a mobile station (MS) on the first network and the second network or between an MS on the second network and the first network.

19. The inter-network tunnel switching method according to claim 18, wherein the performing of triggering switching from a first tunnel to the second tunnel takes place between a third inter-network interconnection device on the first network and the second inter-network interconnection device on the second network or between the first inter-network interconnection device on the first network and the third inter-network interconnection device on the second network.

20. A first inter-network interconnection device, wherein the first inter-network interconnection device is located on a first network and comprises:

a setup triggering unit, configured to set up a second tunnel between the first inter-network interconnection device on the first network and a second inter-network interconnection device on a second network, wherein the first and the second inter-network interconnection devices are selected from one of an access network (AN) and a mobility management entity (MME), and performing trigger switching by one of the first and the second inter-network interconnection devices from a first tunnel to the second tunnel, wherein the first and second tunnels are configured to forward signaling between a mobile station (MS) on the first network and the second network or between an MS on the second network and the first network.

21. The first inter-network interconnection device according to claim 19, wherein the performing of trigger switching from a first tunnel to the second tunnel takes place between a third inter-network interconnection device on the first network and the second inter-network interconnection device on the second network or between the first inter-network interconnection device on the first network and the third inter-network interconnection device on the second network.

* * * * *